US008260155B2

(12) United States Patent
Inoue

(10) Patent No.: US 8,260,155 B2
(45) Date of Patent: Sep. 4, 2012

(54) CARRIER DETECTION CIRCUIT, METHOD FOR CONTROLLING CARRIER DETECTION CIRCUIT, AND INFRARED SIGNAL PROCESSING CIRCUIT HAVING THE CARRIER DETECTION CIRCUIT

(75) Inventor: Takahiro Inoue, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 1440 days.

(21) Appl. No.: 11/826,478

(22) Filed: Jul. 16, 2007

(65) Prior Publication Data

US 2008/0018806 A1 Jan. 24, 2008

(30) Foreign Application Priority Data

Jul. 18, 2006 (JP) ................................ 2006-196079

(51) Int. Cl.
*H04B 10/06* (2006.01)

(52) U.S. Cl. ....................................... 398/209; 398/210

(58) Field of Classification Search ........... 398/208–210
See application file for complete search history.

(56) References Cited

U.S. PATENT DOCUMENTS 4,318,128 A * 3/1982 Sauvanet ...................... 348/465
5,155,447 A 10/1992 Huijsing et al.
5,247,211 A 9/1993 Sakura
5,428,316 A 6/1995 Molnar et al.
5,578,964 A 11/1996 Kim et al.
6,181,196 B1 1/2001 Nguyen
6,335,655 B1 1/2002 Yamamoto et al.
6,516,026 B1 2/2003 Blatz et al.
6,704,560 B1 3/2004 Balteanu et al.
7,173,486 B1 2/2007 Sutardja
7,265,626 B2 * 9/2007 Teo et al. ...................... 330/279
7,583,944 B2 * 9/2009 Kurz .......................... 455/240.1
7,635,837 B2 12/2009 Uo et al.
7,719,349 B2 5/2010 Okada
7,865,087 B2 * 1/2011 Inoue ............................ 398/208
7,894,727 B2 * 2/2011 Inoue ............................ 398/202

(Continued)

FOREIGN PATENT DOCUMENTS

JP 5-114836 A 5/1993

(Continued)

OTHER PUBLICATIONS

U.S. Notice of Allowance issued in U.S. Appl. No. 11/929,805 on Sep. 29, 2010.

(Continued)

*Primary Examiner* — Shi K Li
(74) *Attorney, Agent, or Firm* — Birch, Stewart, Kolasch & Birch LLP

(57) ABSTRACT

An infrared remote control receiver 20*a* includes a carrier detection circuit 12*a*. The carrier detection circuit 12*a* includes: a comparator 6*a* for comparing an output signal from a BPF 5 with a threshold voltage Vth1 which is a noise detection level; a comparator 6*c* for comparing the output signal from the BPF 5 with a threshold voltage Vth3 larger than the threshold voltage Vth1, the threshold voltage Vth3 being a first carrier detection level; and a logic circuit 8 for (i) controlling, based on the output signal D1 from the comparator 6*a*, the gain of an amplifier 4 so that an output signal D1 from the comparator 6*a* is not output. An output signal D3 from the comparator 6*c* is output as a carrier. Thus, it is possible to restrain malfunctions attributed to disturbance light noise.

24 Claims, 13 Drawing Sheets

U.S. PATENT DOCUMENTS

| | | | |
|---|---|---|---|
| 2001/0020865 | A1 | 9/2001 | Morie et al. |
| 2003/0006834 | A1 | 1/2003 | Morie et al. |
| 2003/0052661 | A1 | 3/2003 | Tachimori |
| 2003/0171108 | A1 | 9/2003 | Eichin et al. |
| 2004/0239426 | A1 | 12/2004 | Miwa et al. |
| 2005/0118975 | A1 | 6/2005 | Ismail |
| 2008/0018806 | A1 | 1/2008 | Inoue |
| 2008/0112711 | A1 | 5/2008 | Inoue |
| 2008/0112712 | A1 | 5/2008 | Inoue |

FOREIGN PATENT DOCUMENTS

| | | | |
|---|---|---|---|
| JP | 6-510407 | A | 11/1994 |
| JP | 7-212187 | A | 8/1995 |
| JP | 7-307624 | A | 11/1995 |
| JP | 8-18472 | A | 1/1996 |
| JP | 10-173482 | A | 6/1998 |
| JP | 11-266126 | A | 9/1999 |
| JP | 11-288321 | A | 10/1999 |
| JP | 11-331076 | A | 11/1999 |
| JP | 2001-502147 | A | 2/2001 |
| JP | 2001-292051 | A | 10/2001 |
| JP | 2002-238087 | A | 8/2002 |
| JP | 2002-305428 | A | 10/2002 |
| JP | 2002-330058 | A | 11/2002 |
| JP | 2003-84846 | A | 3/2003 |
| JP | 2003-523124 | A | 7/2003 |
| JP | 2004-056541 | A | 2/2004 |
| JP | 2004-506375 | A | 2/2004 |
| JP | 2004-328487 | A | 11/2004 |
| JP | 2005-354172 | A | 12/2005 |
| JP | 2006-060410 | A | 3/2006 |
| JP | 2006-148572 | A | 6/2006 |
| JP | 2008-28476 | A | 2/2008 |
| JP | 2008-125023 | A | 5/2008 |
| WO | WO 93/05572 | A1 | 3/1993 |
| WO | WO 01/59925 | A1 | 8/2001 |
| WO | WO 02/13403 | A1 | 2/2002 |

OTHER PUBLICATIONS

U.S. Notice of Allowance issued in U.S. Appl. No. 11/933,054 on Nov. 24, 2010.

U.S. Office Action issued in U.S. Appl. No. 11/929,805 on Jul. 1, 2010.

U.S. Office Action issued in U.S. Appl. No. 11/933,054 on Jul. 1, 2010.

* cited by examiner

When CLK = H, Q data is switched

When CLK = L, Q data is latched, and D data is input

CARRIER DETECTION CIRCUIT, METHOD FOR CONTROLLING CARRIER DETECTION CIRCUIT, AND INFRARED SIGNAL PROCESSING CIRCUIT HAVING THE CARRIER DETECTION CIRCUIT

This Nonprovisional application claims priority under 35 U.S.C. §119(a) on Patent Application No. 2006/196079 filed in Japan on Jul. 18, 2006, the entire contents of which are hereby incorporated by reference.

FIELD OF THE INVENTION

The present invention relates to: a carrier detection circuit capable of removing disturbance light noise stemming from a fluorescent lamp or an incandescent lamp; a method for controlling the carrier detection circuit; and an infrared signal processing circuit having the carrier detection circuit, which processing circuit receives and demodulates signals transmitted from an infrared transmitter, and outputs the demodulated signals.

BACKGROUND OF THE INVENTION

Typical examples of an infrared signal processing circuit are: remote controllers of home electric appliances and peripheral devices of personal computers, each of which performs data communication in compliance with IrDA (Infrared Data Association) standard. Such an infrared remote control receiver receives ASK (Amplitude Shift Keying) signals (remote controller transmission signals) modulated by a predetermined carrier of, for example, approximately 30 kHz to 60 kHz.

Here, light from a home-use inverter fluorescent light also contains carrier components of 30 kHz to 60 kHz. For this reason, an infrared remote control receiver, when used around a fluorescent light, may malfunction by detecting noise stemming from the fluorescent light. In worst situation, the infrared remote control receiver may not be able to accurately receive signals transmitted from the remote control.

To solve this problem, a data transferring system disclosed in Patent citation 1 (Published Japanese Translations of PCT International Publication for Patent Applications: 502147/2001 (Tokuhyou 2001-502147; Published on Feb. 13, 2001)) is provided with a certain period range T check. The system judges whether a received signal is an infrared signal or noise, according to whether or not a halt period Td occurred within the period range T check. If the signal received is judged as to be noise, an amplifier is controlled. However, an infrared signal can vary depending on makers, and there are more than ten different kinds of infrared signals: e.g., NEC codes, Sony codes, RCMM codes, etc. Thus, some infrared signals are not adaptable to the halt period Td of the data transferring system, and the system is not able to receive those inadaptable infrared signals.

Furthermore, in a receiver circuit disclosed in Patent citation 2 (Published Japanese Translations of PCT International Publication for Patent Applications: 506375/2004 (Tokuhyou 2004-506375; published on Feb. 26, 2004)), an output signal from a bandpass filter is demodulated, and the demodulated signal is used as a trigger for controlling an amplifying circuit and the bandpass filter. However, this receiver circuit has the following problem. Namely, when noise from fluorescent light having a high illuminance is incident on the receiver circuit, the output signal of the bandpass filter is saturated by the noise. This causes the demodulated signal to be constantly in the L level. Due to this, the demodulated signal does not function as the trigger, and as the result, the amplifying circuit and bandpass filter are not controlled.

SUMMARY OF THE INVENTION

In view of the foregoing problems, the present invention is made, and it is an object of the present invention to realize a carrier detection circuit, a method for controlling the carrier detection circuit, and an infrared signal processing circuit, each of which reduces malfunctions attributed to disturbance light noise in an infrared signal processing circuit while avoiding problems in Patent citations 1 and 2.

In order to achieve the object, a carrier detection circuit of the present invention is a carrier detection circuit for performing carrier detection, including: a first comparing circuit; a second comparing circuit; and a logic circuit, wherein: said carrier detection circuit is for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component; said first comparing circuit compares (i) an output signal of the bandpass filter with (ii) a first threshold voltage which is a noise detection level; said second comparing circuit compares (i) the output signal of the bandpass filter with (ii) a second threshold voltage which is a first carrier detection level, and whose level is higher than that the first threshold voltage; and said logic circuit outputs as the carrier an output signal of said second comparing circuit, and controls the gain of the amplifying circuit based on the output signal of said first comparing circuit so that the output signal of said first comparing circuit is not output.

Further, in order to achieve the object, a method of the present invention for controlling a carrier detection circuit is a method of controlling a carrier detection circuit for performing carrier detection which circuit is for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component; said method comprising the steps of: comparing in a first comparing circuit (i) an output signal from the bandpass filter with a first threshold voltage which is a noise detection level; comparing in a second comparing circuit (i) the output signal of the bandpass filter with (ii) a second threshold voltage which is a first carrier detection level, and whose level is higher than that the first threshold voltage; and controlling with a use of a logic circuit the gain of the amplifying circuit based on the output signal from the first comparing circuit so that the output signal from the first comparing circuit is not output; and outputting from the logic circuit the output signal from the second comparing circuit as a carrier.

In the above control method and configuration, the carrier detection circuit of the present invention (i) compares, in the first comparing circuit, the output signal from the bandpass filter with the first threshold voltage which is the noise detection level, and (ii) controls the gain of the amplifying circuit based on the output signal from the first comparing circuit so that the output signal of the first comparing circuit is not output. With this configuration and the control method, the disturbance light noise having entered is reduced without fail to a level not more than the noise detection level which is lower than the carrier detection level. Thus, malfunctions attributed to disturbance light noise is reduced.

Further, unlike the configuration of the Patent citation 1, the carrier detection circuit of the present invention is not such that the pattern of an infrared signal is detected. Therefore, the present invention is applicable to various types of infrared signals. Further, with the carrier detection circuit of the present invention, there will not be a problem of going out of control as would happen in the configuration of Patent citation 2. This is because the carrier detection circuit of the present invention performs control by using the output signal from the comparing circuit, which signal is acquired as the result of comparison performed with respect to the output signal from the bandpass filter, and as long as the bandpass filter is oscillating, it is unlikely that the output signal of the comparing circuit is missing when the control needs to be performed.

Thus, as described, it is possible to realize a carrier detection circuit and a method for controlling the carrier detection circuit each of which reduces malfunctions attributed to disturbance light noise in an infrared signal processing circuit while avoiding problems in Patent citations 1 and 2.

In order to achieve the foregoing object, an infrared signal processing circuit of the present invention includes the above-mentioned carrier detection circuit.

According to the above configuration, the infrared signal processing circuit includes the above-mentioned carrier detection circuit. Therefore, malfunctions attributed to disturbance light noise can be reduced.

Examples of the infrared signal processing circuit are: an infrared remote control receiver, IrDA transmission/reception device, and an IrDA Control.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 4(*b*) is a diagram showing an operation of the comparator.

FIG. 4(*c*) is a diagram showing an operation of the comparator.

FIG. 5(*b*) is a diagram showing an operation waveform of the oscillation circuit.

FIG. 8(*b*) is a diagram showing an operation of the D flip-flop.

FIG. 8(*c*) is a diagram showing an operation of the D flip-flop.

FIG. 13(*b*) is a diagram explaining waveform distortion in an output signal of the BPF.

DESCRIPTION OF THE EMBODIMENTS

Embodiment 1

The following describes an embodiment of the present invention with reference to FIGS. 1 to 8. An infrared signal processing circuit of the present invention which receives and demodulates infrared signals and outputs the demodulated signals is suitably applicable to: an infrared remote control receiver (transmission rate: 1 kbps or less, spatial transmission distance: 10 m or longer); an IrDA transmitter/receiver (transmission rate: 2.4 kbps-115.2 kbps, 1.152 Mbps, or 4 Mbps, spatial transmission distance: approx. 1 m); and an IrDA Control (transmission rate: 75 kbps, subcarrier: 1.5 MHz, spatial transmission distance: 1 m or longer). The present embodiment deals with an example where the infrared signal processing circuit of the present invention is applied to an infrared remote control receiver.

Figure 1:
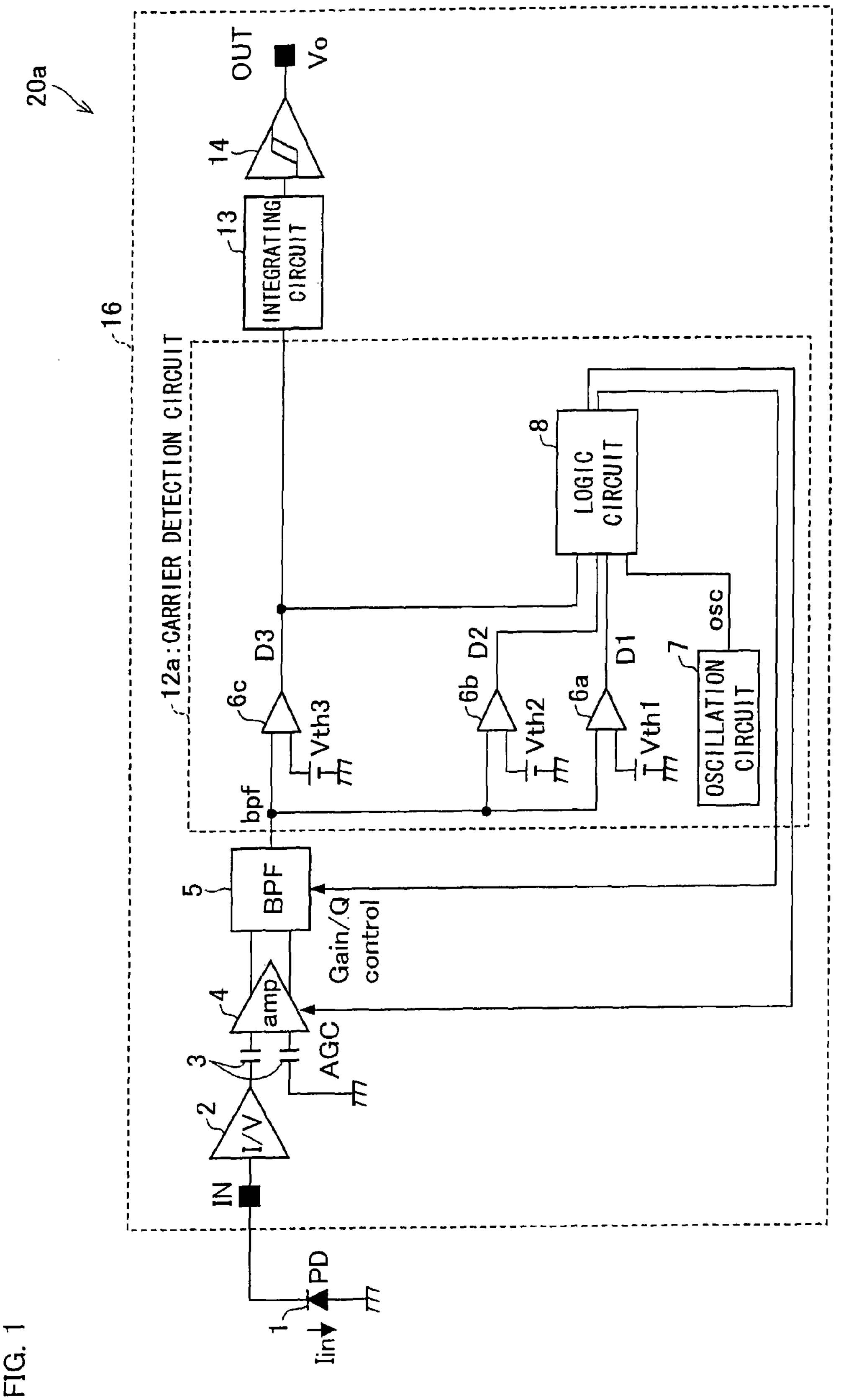
FIG. 1 is a diagram showing an exemplary configuration of an infrared remote control receiver of an embodiment, in accordance with the present invention.

FIG. 1 shows an exemplary configuration of an infrared remote control receiver 20*a*.

An infrared remote control receiver 20*a* includes a photodiode chip 1 (photo-acceptance element) and a reception chip 16. The reception chip 16 includes: a current-to-voltage-conversion circuit 2; a capacitor 3; an amplifier (amplifying circuit) 4; a bandpass filter (Hereinafter simply referred to as BPF) 5; a carrier detection circuit 12*a*; an integrating circuit 13; and a hysteresis comparator 14. In the figure, an input terminal IN serves as an input terminal of the reception chip 16, and an output terminal OUT serves as an output terminal of the reception chip 16. An output signal Vo in the figure is an output signal of the infrared remote control receiver 20*a*.

In the infrared remote control receiver 20*a*, the photodiode chip 1 converts an infrared signal (remote control transmission signal) received from an infrared remote control transmitter (not shown) into a current signal Iin. This current signal Iin is then converted into a voltage signal by the current-to-voltage-conversion circuit 2, and the voltage signal is amplified by the amplifier 4. Then, from the amplified voltage signal, the BPF 5 extracts a carrier frequency component, and the carrier detection circuit 12*a* detects a carrier in the extracted carrier frequency component. A period during which the carrier exists is integrated by the integrating circuit 13, and the output from the integrating circuit 13 is compared with a threshold level in the hysteresis comparator 14 to judge whether or not the carrier exits. The result of the judgment is then output in the form of digital output Vo. This digital output Vo is sent to a microcomputer or the like which controls an electronic device.

The carrier detection circuit 12*a* includes: comparators 6*a* (first comparing circuit), 6*b* (third comparing circuit), and 6*c* (second comparing circuit); an oscillation circuit 7; and a logic circuit 8 which performs a logical operation on the basis of respective outputs from the comparators 6*a* to 6*c*. In addition to the carrier detection, the carrier detection circuit 12*a* controls the gain of the amplifier 4 and the gain and Q-value of the BPF 5.

An output signal bpf from the BPF 5 is input to one of input terminals of each of the comparators 6*a* to 6*c*. To another input terminal of the comparator 6*a*, a threshold voltage Vth1 (first threshold voltage) is input. To another input terminal of the comparator 6*b*, a threshold voltage Vth2 (third threshold voltage) is input. To another input terminal of the comparator 6*c*, a threshold voltage Vth3 (second threshold voltage) is input. The threshold voltage Vth1 is a noise detection level. The threshold voltage Vth2 is a peak detection level for judging the level of the output signal bpf from the BPF 5. The threshold voltage Vth3 is a first signal detection level (a first carrier detection level). These threshold voltages Vth1 to Vth3 are such that: Vth1<Vth3<Vth2.

The comparator 6*a* compares the output signal bpf of the BPF 5 with the threshold voltage Vth1, and outputs an output signal D1 if the level of the output signal bpf of the BPF 5 surpasses the level of the threshold voltage Vth1. Similarly, the comparator 6*b* compares the output signal bpf of the BPF 5 with the threshold voltage Vth2, and outputs an output signal D2 if the level of the output signal bpf of the BPF 5 surpasses the level of the threshold voltage Vth2. The comparator 6*c* compares the output signal bpf of the BPF 5 with the threshold voltage Vth3, and outputs an output signal D3 if the level of the output signal bpf of the BPF 5 surpasses the level of the threshold voltage Vth3. The output signal D3 of the comparator 6*c* is input as a detected carrier to the integrating circuit 13.

The oscillation circuit 7 oscillates at the same frequency as the center frequency of the BPF 5, for example.

Figure 2:
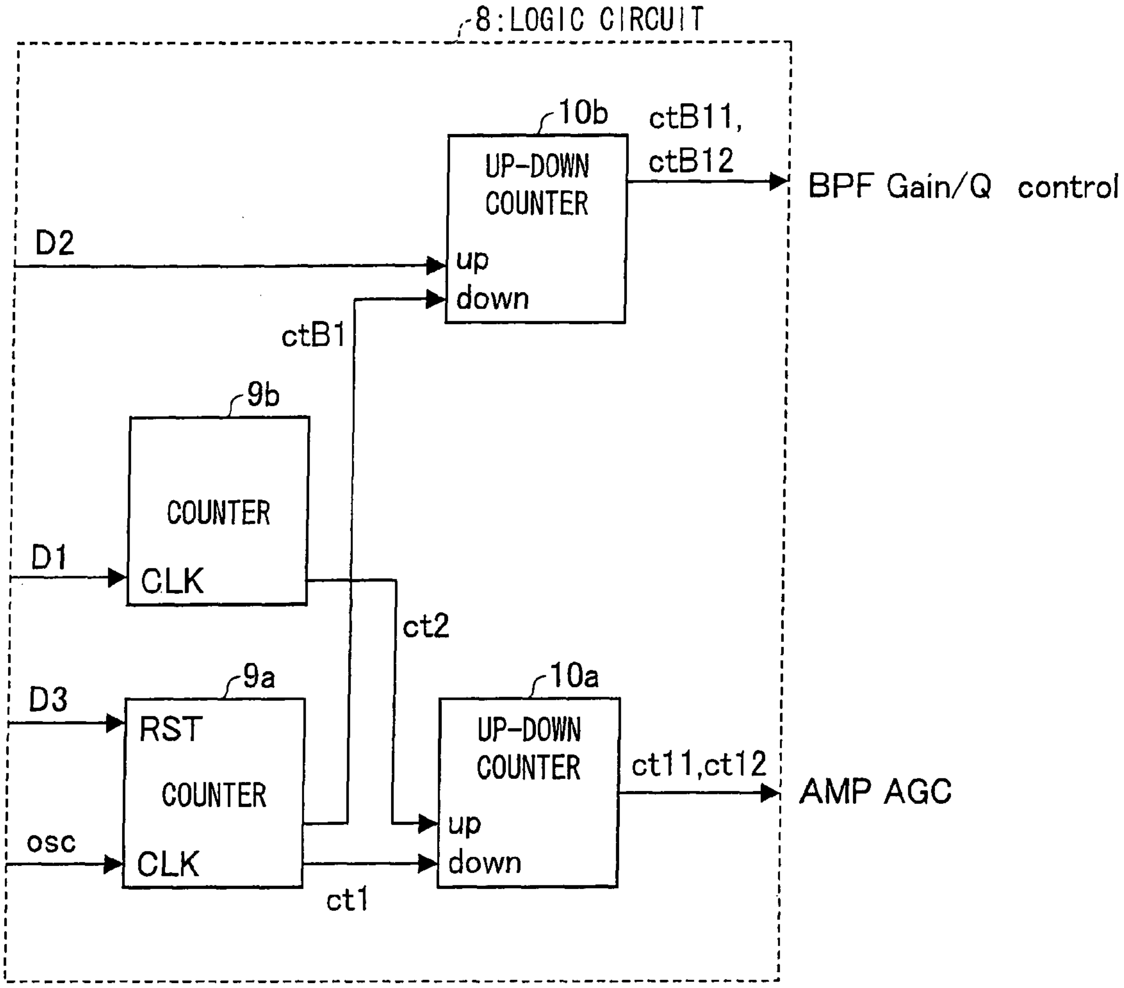
FIG. 2 is a block diagram showing an exemplary configuration of a logic circuit provided in the infrared remote control receiver.

FIG. 2 shows an exemplary configuration of the logic circuit 8.

The logic circuit 8 includes: counters 9*a* (first counter) and 9*b* (second counter); and up-down counters 10*a* (first up-down counter) and 10*b* (second up-down counter).

The counter 9*a* performs counting operation in response to input of an output signal (clock signal) osc from the oscillation circuit 7 to a clock terminal CLK thereof. When a predetermined number of pulses (e.g. 15 bits, $2^{15}$=32768 pulses) are counted, the counter 9*a* outputs an amplifier control signal ct1 (first amplifying circuit control signal) for increasing the gain to the up-down counter 10*a*. The counter 9*a* also outputs, when a predetermined number of pulses (e.g. 10 bits, $2^{10}$=1024 pulses) are counted, a BPF control signal ctB1 for increasing the gain and Q-value to the up-down counter 10*b*. Furthermore, to a reset terminal RST of the counter 9*a*, the output D3 from the comparator 6*c* is input.

The time constant of the amplifier control signal ct1, for setting the time constant for controlling the amplifier, is 300 msec or more. Further, the time constant of the BPF control signal ctB1, for setting the time constant for controlling the BPF, is 300 msec or less.

The counter 9*b* performs counting operation in response to input of the output signal D1 from the comparator 6*a* to a clock terminal CLK thereof. When a predetermined number of pulses (e.g. 14 bits, $2^{14}$=16384 pulses) are counted, the counter 9*b* outputs to the up-down counter 10*a* an amplifier control signal ct2 (second amplifying circuit control signal) for reducing the gain. The time constant of the amplifier control signal ct2, for setting the time constant for controlling the amplifier, is 300 msec or more. Here, the respective numbers of outputs of the amplifier control signals ct1 and ct2 have a relation of: the number of outputs of the amplifier control signal ct2>the number of outputs of the amplifier control signal ct1.

The up-down counter 10*a* performs counting operation in response to an amplifier control signal ct1 output from the counter 9*a*, and outputs an amplifier control signal ct11 (first control signal) to the amplifier 4 to increase the gain of the amplifier 4. Further, the up-down counter 10*a* performs counting operation in response to the amplifier control signal ct2 output from counter 9*b*, and outputs an amplifier control signal ct12 (second control signal) to the amplifier 4 to reduce the gain of the amplifier 4.

The up-down counter 10*b* performs counting operation in response to the BPF control signal ctB1 output from the counter 9*a*, and outputs a BPF control signal ctB 11 (third control signal) to the BPF 5 to increase the gain and Q-value of the BPF 5. Further, the up-down counter 10*b* receives an output signal D2 from the comparator 6*b*, and performs counting operation in response to the output signal D2. Then, the up-down counter 10*b* outputs a BPF control signal ctB12 (fourth control signal) to the BPF 5 to reduce the gain and Q-value of the BPF 5.

As described, the carrier detection circuit 12*a* can be realized in a form of digital circuit. This allows downsizing of the chip size, consequently allowing reduction of the cost.

Figure 3:
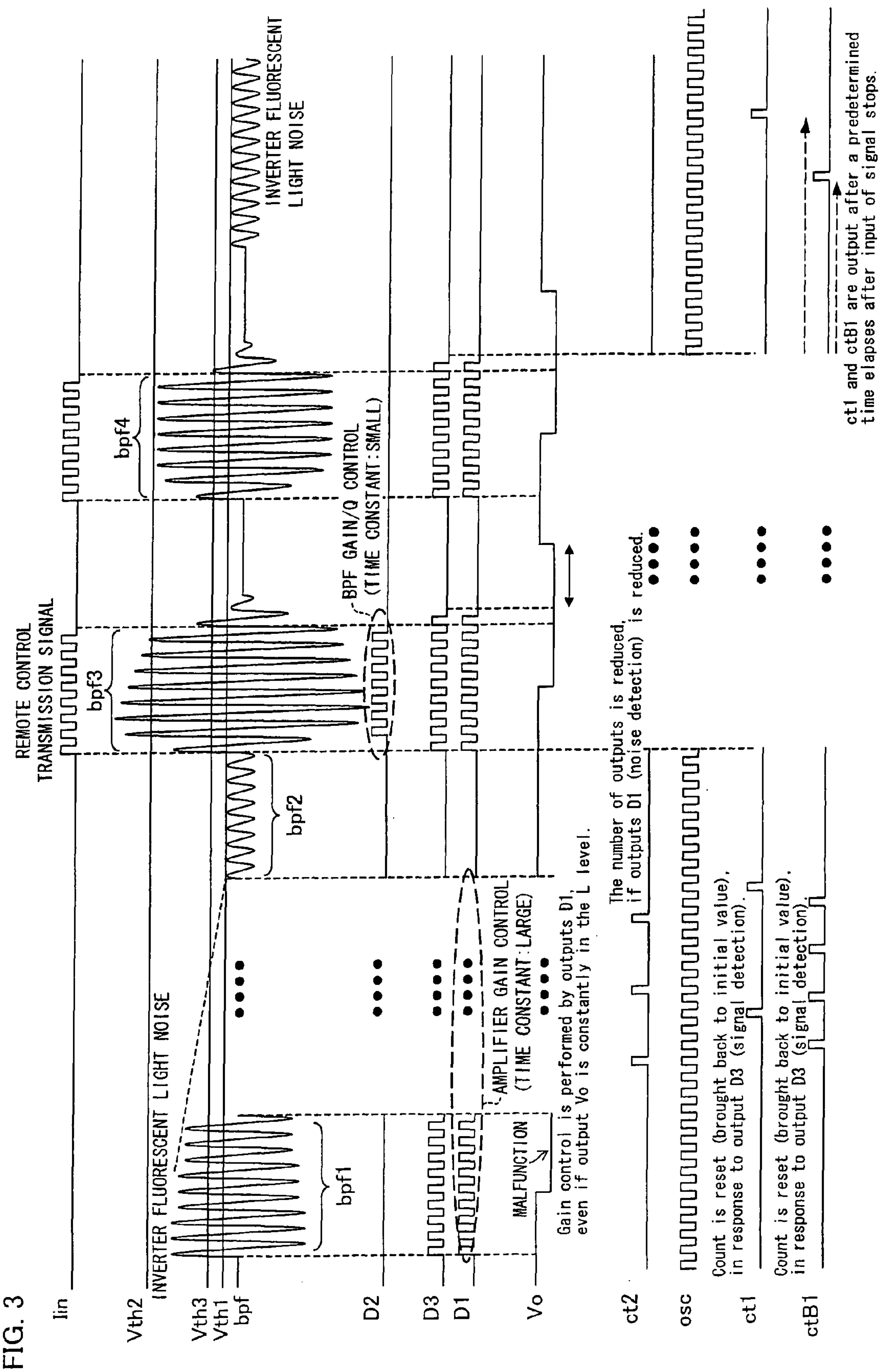
FIG. 3 is a diagram showing operational waveforms of circuits in the infrared remote control receiver.

Next described with reference to FIG. 3 is the operation of the infrared remote control receiver 20*a*. FIG. 3 shows an operation waveform of each circuit in the infrared remote control receiver 20*a*. In FIG. 3, noise from a fluorescent light enters, before a remote control transmission signal enters.

First, when the fluorescent light noise enters the infrared remote control receiver 20*a*, the current-to-voltage-conversion circuit 2, amplifier 4, and BPF 5 respectively perform processes supposed to be performed, and an output signal bpf (bpf1 in the figure) from the BPF 5 is input to each of the comparators 6*a* to 6*c* in the carrier detection circuit 12*a*. Since the relation of the output signal bpf1 to the threshold voltages Vth1 to Vth3 is as shown in the figure, output signals D1 and D3 are respectively output from the comparators 6*a* and 6*c*, as shown in the figure.

Since the output signal D3 from the comparator 6*c* resets the counter 9*a*, the counting operation of the counter 9*a* is stopped. Meanwhile, the output signal D1 from the comparator 6*a* is input to the counter 9*b*, and the counter 9*b* outputs the amplifier control signal ct2 in response to the input. The amplifier control signal ct2 is then input to the up-down counter 10*a*. In response to this, the up-down counter 10*a* outputs the amplifier control signal ct12 to the amplifier 4, so as to cause the amplifier to reduce its gain.

Through this gain control of the amplifier 4, the fluorescent light noise is attenuated. When the comparator 6*c* stops outputting the output signal D3, the counter 9*a* starts its counting operation, and the BPF control signal ctB1 is output to the up-down counter 10*b*. In response to this, the up-down counter 10*b* outputs the BPF control signal ctB11 to the BPF 5, so as to causes the BPF 5 to raise its gain and Q-value.

Subsequently, the amplifier control signal ct1 is output to the up-down counter 10*a*. In response to this, the up-down counter 10*a* outputs the amplifier control signal ct11 to the amplifier 4, so as to cause the amplifier 4 to raise its gain. Note that the gain control of the amplifier 4 prompted by the output signal D1 from the comparator 6*a* has been continued at this point. Through the above-mentioned controls of the amplifier 4 and BPF 5, the fluorescent light noise is attenuated to a level not more than the threshold voltage Vth1 of the comparator 6*a* (See Signal bpf2 in the figure). As described, the fluorescent light noise is surely reduced to the level not more than the threshold voltage Vth1 of the comparator 6*a* which voltage is lower than the threshold voltage Vth3 of the comparator 6*c* for detecting a carrier. Thus, it is possible to restrain malfunctions attributed to the fluorescent light noise.

Next, when a remote control transmission signal is input to the infrared remote control receiver 20*a*, the current-to-voltage-conversion circuit 2, amplifier 4, and the BPF 5 perform processes supposed to be performed, and an output signal bpf (Signal bpf3 in the figure) from the BPF 5 is input to each of the comparators 6*a* to 6*c* of in the carrier detection circuit 12*a*. Since the relation of the output signal bpf3 to the threshold voltages Vth1 to Vth3 are as shown in the figure, output signals D1 to D3 are respectively output from the comparators 6*a* to 6*c*, as shown in the figure. Then, the output signal D1 prompts the above mentioned control of the amplifier 4.

Here, in the control prompted by the output signal D1 from the comparator 6*a* and the output signal osc from the oscillation circuit 7, a sufficient time constants of 300 msec or more is ensured for both of the amplifier control signals ct1 and ct2. Therefore, rapid variation of the gain is avoided, and a stable reception sensitivity is achieved when a remote control transmission signal is input.

Further, since the counter 9*a* is reset while the output signal D3 of the comparator 6*c* is output, it is only the control for reducing the gain of the amplifier 4 which is performed, and not the control for increasing the gain of the amplifier 4 or the control for increasing the gain and the Q-value of BPF 5 which are prompted by the output signal osc of the oscillation circuit 7. Thus, the amount of variation of the gain is made small, and a stable reception sensitivity is achieved while remote control transmission signals are input. Furthermore, since it is only the control for reducing the gain of the amplifier 4 which is performed, malfunctions attributed to fluorescent light noise can be further restrained.

While the above-mentioned control is performed, the BPF 5 is controlled by the output signal D2 of the comparator 6*b*. When the output signal D2 of the comparator 6*b* is output, the gain and Q-value of the BPF 5 are controlled, judging that the level of the output signal bpf is unsuitable for the remote control transmission signal, and that a problem such as an increase in the pulse width of the output signal D3 of the comparator 6*c* will occur.

Specifically, when the output signal D2 of the comparator 6*b* is input to the up-down counter 10*b*, the up-down counter 10*b* outputs the BPF control signal ctB12 to the BPF 5 to cause the BPF 5 to reduce the gain and Q-value thereof.

Through this, the output signal bpf of the BPF 5 is attenuated to a level not higher than the threshold voltage Vth2 of the comparator 6 (See bpf4 in the figure), and the level of the output signal bpf is optimized. Thus, a suitable carrier for the remote control transmission signal is output. This control is done quickly, since the time constant set in the up-down counter 10*b* is small.

Here, since the Q-value of the BPF 5 is increased through the control prompted by the output signal D1 of the comparator 6*a* and the output signal osc of the oscillation circuit 7, the following problems for example may occur: deterioration in the stability of the BPF 5; and/or deterioration of the reception sensitivity due to increase in waveform distortion of the output signal bpf of the BPF 5 (For further detail, see Patent citation 3: Japanese Unexamined Patent Publication No. 56541/2004 (Tokukai 2004-56541; Published on Feb. 19, 2004) cited hereinbelow in the comparative example). However, since the Q-value of the BPF 5 is reduced through the above-described control of the BPF 5, such a problem will not occur.

Next, when the input of the remote control transmission signal stops, only the counter 9*a* operates, and outputs the gain control signal ctB1 to the up-down counter 10*b*. Then, the BPF control signal ctB 11 causes the BPF 5 to raise its gain and Q-value. After that, the gain control signal ct1 is output to the up-down counter 10*a*, and the gain control signal ct11 causes the amplifier 4 to raise its gain.

Here, the above description deals with the case where the remote control transmission signal enters after fluorescent light noise is attenuated. However, it is possible that the remote control transmission signal enters before fluorescent light noise is attenuated. This however is not a particular concern, as rapid control of the gain and the Q-value of the BPF 5 is prompted by the output signal D2 of the comparator 6*b*.

Figure 4:
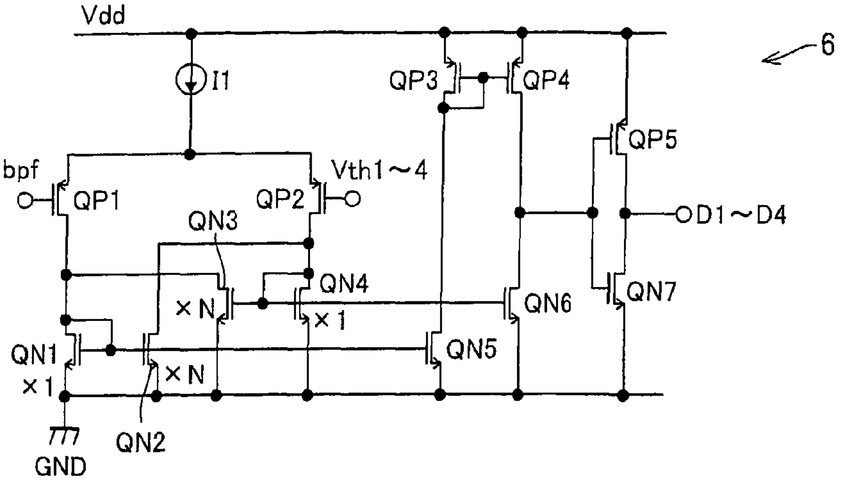
FIG. 4(*a*) is a circuit diagram showing a specific example of configuration of a comparator provided in the infrared remote control receiver.
Figure 4:
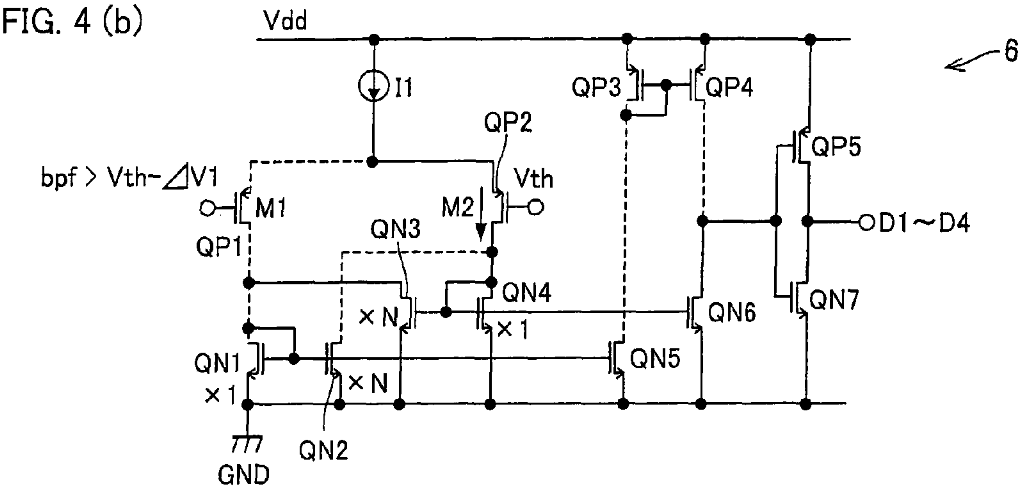
Figure 4:
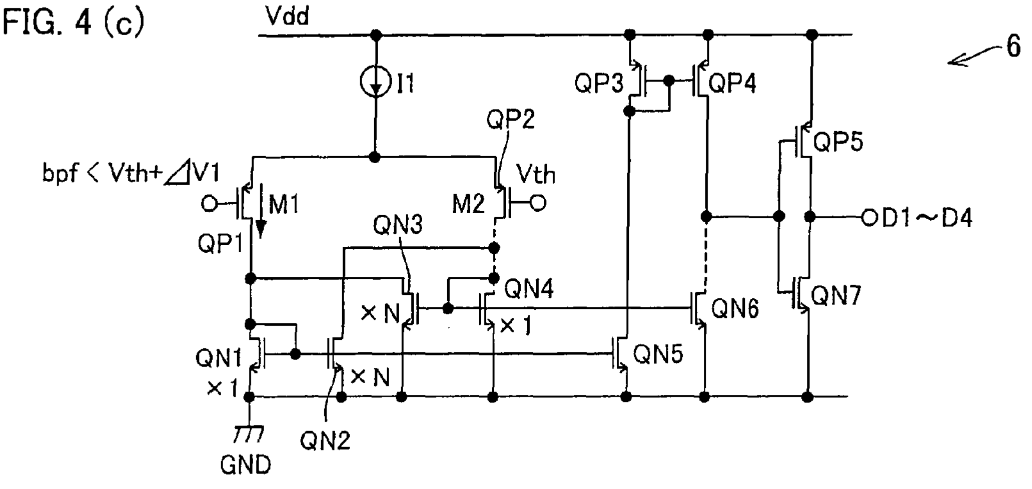

FIG. 4(*a*) shows a specific example of configuration of the comparators 6*a* to 6*c* (Each of these comparators are hereinafter collectively referred to as comparator 6), and FIG. 4(*b*) and FIG. 4(*c*) show an operation of the comparator 6. In the following, a MOS transistor QP refers to a P-channel MOS transistor, and an MOS transistor QN refers to an N-channel MOS transistor. The same goes for a comparator 6*d* described hereinbelow in Embodiment 2.

The comparator 6 is a hysteresis comparator as shown in FIG. 4(*a*). First described is how each element is connected to the others. The respective sources of the MOS transistors QP1 and QP2 are connected to each other, and are connected to a power source terminal Vdd via a current source I1. The gate of an MOS transistor QP1 serves as one of the input terminals of the comparator 6, and the output signal bpf of the BPF 5 is input to the gate of the MOS transistor QP1. The gate of an MOS transistor QP2 serves as another one of the input terminals of the comparator 6, and a threshold voltage Vth (collective name for threshold voltages Vth1 to Vth4) is input to the gate of the MOS transistor QP2.

The drain of the MOS transistor QP1 is connected to the drain of an MOS transistor QN1. The MOS transistor QN1 and an MOS transistor QN2 form a current mirror circuit. The gate of the MOS transistor QN1 is connected to the drain of an MOS transistor QN1. The drain of the MOS transistor QP2 is connected to the drain of an MOS transistor QN4. The MOS transistor QN4 and an MOS transistor QN3 form a current mirror circuit. The gate of the MOS transistor QN4 is connected to the drain of an MOS transistor QN4. Furthermore, the drain of the MOS transistor QP1 is connected to the drain of the MOS transistor QN3, and the drain of the MOS transistor QP2 is connected to the drain of the MOS transistor QN2.

The gate of the MOS transistor QN1 is connected to the gate of an MOS transistor QN5, and the gate of the MOS transistor QN3 is connected to the gate of an MOS transistor QN6. The drain of the MOS transistor QN5 is connected to the drain of an MOS transistor QP3. The MOS transistors QP3 and an MOS transistor QP4 form a current mirror circuit. The gate of the MOS transistor QP3 is connected to the drain of an MOS transistor QP3. The drain of the MOS transistor QN6 is connected to the drain of the MOS transistor QP4.

Further, a connection point of the drain of the MOS transistor QP4 and the drain of the MOS transistor QN6 is connected to an input terminal of a CMOS inverter formed by an MOS transistor QP5 and an MOS transistor QN7. An output terminal of this CMOS inverter serves as an output terminal of the comparator 6. The respective sources of the MOS transistors QP3 to QP5 are connected to the power source terminal Vdd, and the respective sources of the MOS transistors QN1 to QN7 are connected to a GND terminal.

Next described with reference to FIG. 4(*b*) and FIG. 4(*c*) is an operation of the comparator 6. FIG. 4(*b*) shows an operation whereby an output signal bpf of the BPF 5 transits from a large value to a small value. FIG. 4(*c*) shows an operation whereby an output signal bpf of the BPF 5 transits from a small value to a large value. Note that the broken lines in FIG. 4(*b*) and FIG. 4(*c*) indicates that no current is flowing.

First, the operation of FIG. 4(*b*) is explained. In FIG. 4(*b*), the value of the output signal bpf of BPF 5 is large, and therefore the output signal from the comparator 6 is in the H level (the output signal D1 and D4 is output).

When the output signal bpf>Vth-ΔV1, no current flows in the MOS transistor QP1, and therefore, the MOS transistor QP2 enters the overdrive state. Since, no drain current flows in the MOS transistor QN1, no drain current flows in the MOS transistor QN2 either. Accordingly, the MOS transistor QN4 turns on, and so does the MOS transistor QN3. However, since no drain current flows in the MOS transistor QN3, the drain-source voltage Vds of the MOS transistor QN3 is 0V. Therefore, the respective gate potentials of the MOS transistors QN1 and QN2 is GND. Thus, the MOS transistors QN1 and QN2 turn off. At this point, the MOS transistor QN6 turns on, and so does the MOS transistor QP5. Accordingly, the output signal of the comparator 6 is in the H level.

The level of the output signal bpf of the BPF 5 is reduced so that: the output signal bpf=Vth−ΔV1. At this point, the MOS transistor QP2 exits the overdrive state, and the drain current of the MOS transistor QP2 can be reduced. When a drain current starts to flow in each of the MOS transistor QP1 and the MOS transistor QP2, the drain current flowing in the MOS transistor QP1 flows into the MOS transistor QN3. Thus, the drain current flowing in the MOS transistor QP1 is N times as much as that flows in the MOS transistor QP2. Thus, the drain current M1 of the MOS transistor QP1={N/(N+1)}×I1, and the drain current M2 of the MOS transistor QP2={1/(N+1)}×I1, and the differential pair is balanced.

Further, at this point, a difference in the gate-source voltage Vgs of the MOS transistor QP1 and the MOS transistor QP2 is ΔV. Here, it is supposed that: respective W/L ratios (where W is the gate width, and L is the gate length) of the drain currents M1 and M2 are equal to each other; Vgs1 is the gate-source voltage of the MOS transistor QP1; and Vgs2 is the gate-source voltage of the MOS transistor QP2. Since, respective source potentials of the MOS transistor QP1 and the MOS transistor QP2 are equal to each other, $$Vth+Vgs2=Vth-\Delta V1+Vgs1.$$

Thus:

$$\Delta V1 = Vgs1 - Vgs2 \qquad (1)$$
$$= 2^{1/2} \times Vov \times \{(N/(N+1))^{1/2} - (1/(N+1))^{1/2}\}.$$

However, Vov=(I1/(μ0×Cox×W/L))$^{1/2}$.

where: μ0 is the mobility of a carrier; Cox is the capacity of the gate insulative film; and Vov is an overdrive voltage of the MOS transistors QP1 and QP2 for causing flows of the drain currents M1 and M2, in a case of having not hysteresis (N=1).

Next, when the level of the output signal bpf of the BPF 5 is further reduced so that: the output signal bpf<Vth-ΔV1, the drain current of the MOS transistor QP1 increases, and therefore the current of the MOS transistor QN3 increases as well. However, when the drain current of the MOS transistor QP1 increase, the drain current of the MOS transistor QP2 is decreases. As such, the current of the MOS transistor QN3 is not able to increase. Accordingly, the drain current of the MOS transistor QP1 rapidly charges the gate of the MOS transistor QN1, thereby turning on the MOS transistor QN1. Thus, the drain-source voltage Vds of the MOS transistor QN3 increases. Further, the MOS transistor QN2 also turns on.

However, since the MOS transistor QN2 is designed so as to achieve a flow of current which is N times as much as the current flowing in the MOS transistor QN1, the current of the MOS transistor QP2, which suppose to be increased, is reduced. For this reason, the MOS transistor QN2 acquires current from the gates of the MOS transistor QN4, thereby causing the gate potentials of the MOS transistors QN3 and QN4 to fall. Thus, the MOS transistors QN3 and QN4 are turned off. However, since there is a limit to the amount of the current the MOS transistor QN2 is able to acquire, the drain current stops flowing in the MOS transistor QN2 when the amount reaches the limit, and the drain-source voltage Vds of the MOS transistor QN2 changes to 0V. As a result, the respective gate potentials of the MOS transistors QN3 and QN4 are GND, and no drain current flows in the MOS transistor QP2.

As described, the balance is instable while: the output signal bpf=Vth−ΔV1 when: the output signal bpf<Vth−ΔV1, the distribution of current in the circuit is reversed, and the output signal of the comparator 6 switches to an L level.

FIG. 4(*c*) shows a case where the level of the output signal bpf of the BPF 5 rises, while the output signal level of the comparator 6 is in L level as in FIG. 4(*b*). In the figure, the output signal level of the comparator 6 is in L level.

In FIG. 4(*b*), the source potentials of the MOS transistors QP1 and QP2 are higher after the state of output signal bpf of the BPF 5 has transisted from output signal bpf=Vth−ΔV1 to output signal bpf<Vth−ΔV1, as compared with the source potentials at the moment of transition. This is because the state transition is caused by a positive feedback, and the MOS transistor QP1 enters the overdrive state if the output signal bpf of the BPF 5 is less than Vth−ΔV1 even by a slightest amount. Accordingly, when the level of the output signal bpf from the BPF 5 rises while the output signal from the comparator 6 is in the L level as in FIG. 4(*c*), the drain current of the MOS transistor QP1 does not decrease unless the output signal bpf rises up to Vth+ΔV2 which is larger than Vth−ΔV1. As a result, the drain current does not flow in the MOS transistor QP2. Thus, while: the output signal bpf<Vth+ΔV2, the drain current flows in the MOS transistor QP1 but not in the MOS transistor QP2. Therefore, the current distribution is the same as: the output signal bpf<Vth−ΔV1. Accordingly, the output signal of the comparator 6 is in the L level.

When the level of the output signal bpf rises to Vth+ΔV2, the drain current flows in both of the MOS transistors QP1 and QP2.

At this point, the drain current M1 of the MOS transistor QP1={1/(N+1)}×I1, and the drain current M2 of the MOS transistor QP2={N/(N+1)}×I1. Thus, the differential pair is balanced.

At this point, Vth+Vgs2=Vth+ΔV2+Vgs1.

Thus, $$\Delta V2 = Vgs2 - Vgs1 \qquad (2)$$
$$= 2^{1/2} \times Vov \times \{(N/(N+1))^{1/2} - (1/(N+1))^{1/2}\}$$

Accordingly, based on the formulas (1) and (2), $$\Delta V1=\Delta V2=\Delta V,$$

and Vth−ΔV1 and Vth+ΔV2 are symmetrical to each other in relation to Vth.

Next, when the level of the output signal bpf of the BPF 5 rises so that output signal bpf>Vth+ΔV2, the current distribution is the same as that in a case of the output signal bpf>Vth−ΔV1. Therefore, the level of the output signal from the comparator 6 is in the H level. At this point, due to an effect from the positive feedbacking, drain current stops flowing in the MOS transistor QP1, and the MOS transistor QP2 enters the overdrive state. If the level of the output signal bpf of the BPF 5 is reduced during this state, the change explained with reference to FIG. 4(*b*) occurs.

By configuring the comparator 6 as the above-described hysteresis comparator, the respective pulse widths of the outputs D1 to D3 increase, and the respective counting operations of the counters 9*a* and 9*b* are triggered without fail, even if the level of the output signal bpf of the BPF 5 is nearby the threshold voltage Vth.

Figure 5:
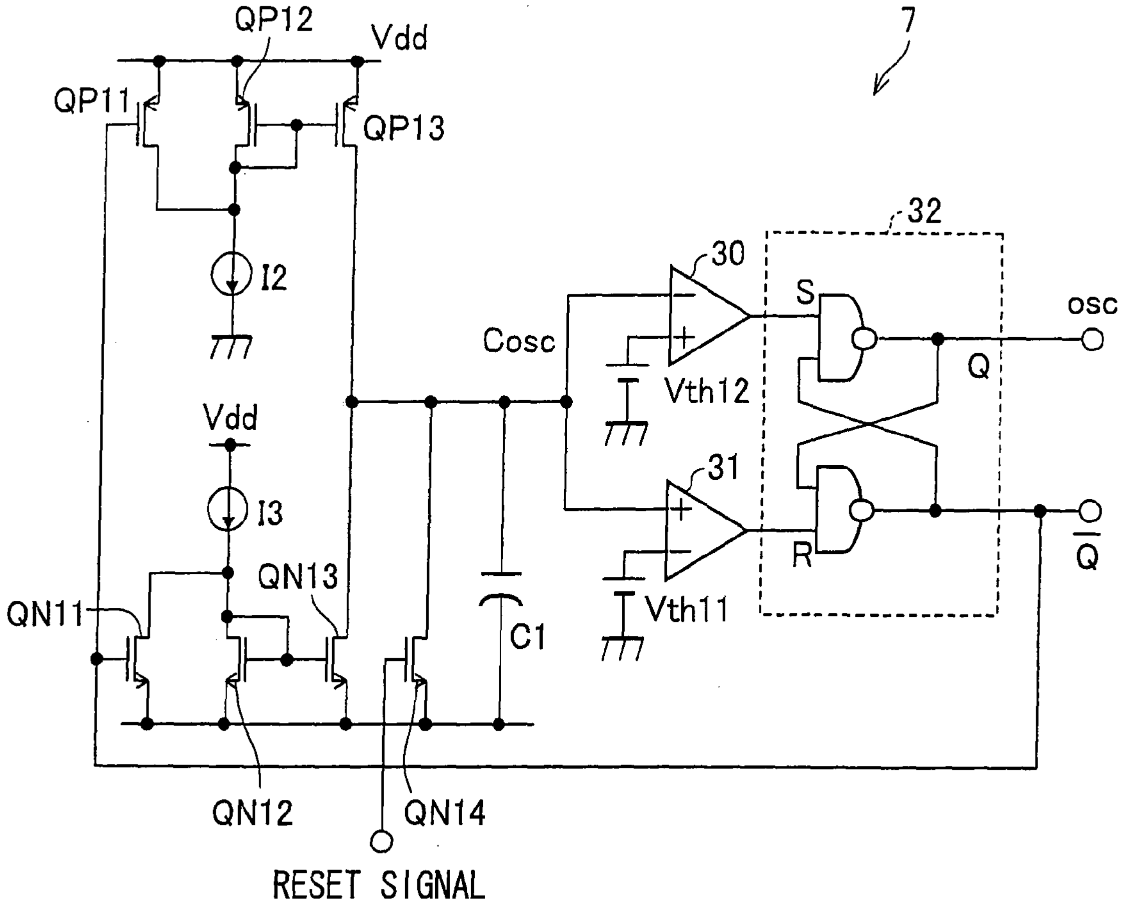
FIG. 5(*a*) is a circuit diagram showing a specific example of configuration of an oscillation circuit provided in the infrared remote control receiver.
Figure 5:
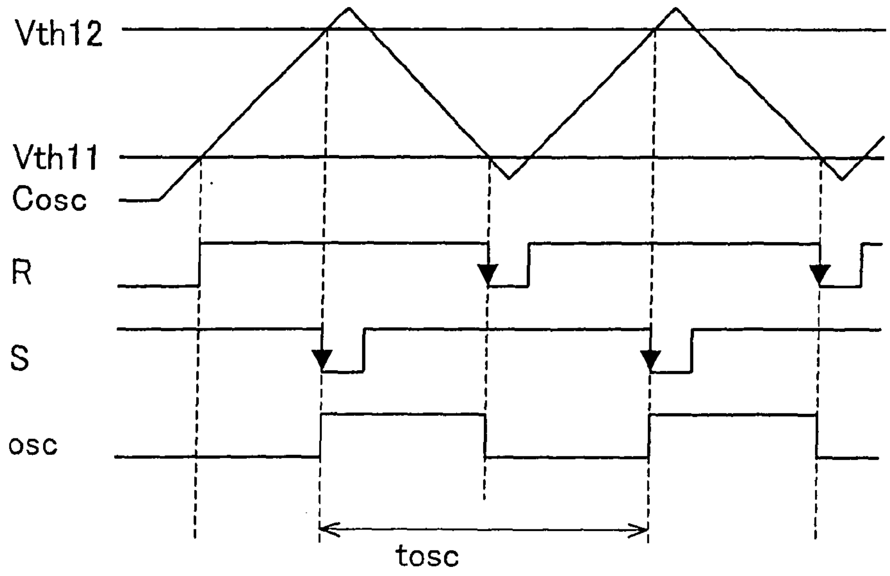

FIG. 5(*a*) shows an exemplary configuration of the oscillation circuit 7, and FIG. 5(*b*) shows its operation waveform. Note that a cycle tosc in the figure is the cycle of the output signal osc from the oscillation circuit. First, connections of elements in the oscillation circuit 7 are described.

The respective sources of an MOS transistor QP11, an MOS transistor QP12, and an MOS transistor QP13 are connected to the power source terminal Vdd. The drain of the MOS transistor QP11 is connected to the drain of an MOS transistor QP12. The MOS transistor QP12 and the MOS transistor QP13 form a current mirror circuit. The gate of the MOS transistor QN12 is connected to the drain of the MOS transistor QN12. The gate of the MOS transistor QP12 is connected to the drain of the MOS transistor QP12. A connection point via which the drains of the MOS transistors QP11 and QP12 are connected is connected to a GND terminal via a current source I2. The respective sources of an MOS transistor QN11, an MOS transistor QN12, and an MOS transistor QN13 are connected to a GND terminal. The drain of the MOS transistor QN11 is connected to the drain of the MOS transistor QN12. The MOS transistor QN12 and the MOS transistor QN13 form a current mirror circuit. A point at which the drains of the MOS transistors QN11 and QN12 are connected is connected to the power source terminal Vdd via a current source 13.

The drain of the MOS transistor QP13 and the drain of the MOS transistor QN13 are connected to each other. Between (i) a connection point via which the drains are connected and (ii) the GND terminal, an MOS transistor QN14 and a capacitor C1 are connected in parallel. Further, to this connection point, an inverting input terminal of the comparator 30 and an noninverting input terminal of the comparator 31 are connected. A threshold voltage Vth12 is input to the noninverting input terminal of the comparator 30, and a threshold voltage Vth11 is input to the inverting input terminal of the comparator 31. The threshold voltage Vth11 and the threshold voltage Vth12 are related to each other so that: the threshold voltage Vth11<the threshold voltage Vth12.

An output terminal of the comparator 30 is connected to a set terminal S of a set/reset flip-flop (Hereinafter, simply referred to as SR flip-flop) 32. An output terminal of the comparator 31 is connected to a reset terminal R of the SR flip-flop 32. An output terminal Q bar of the SR flip-flop 32 is connected to the respective gates of the MOS transistors QP11 and the MOS transistor QN11. To the gate of the MOS transistor QN14, a reset signal for resetting the oscillation circuit 7 is input from the outside. An output terminal of the oscillation circuit 7 is an output terminal Q of the SR flip-flop 32.

Next, an operation of the oscillation circuit 7 is described, with reference to FIG. 5(*b*).

First, it is supposed that a signal in the L level is output from the output terminal Q of the SR flip-flop 32. This causes an output current from the current source 12 to flow into the capacitor C1 via the current mirror circuit including the MOS transistors QP12 and QP13, thereby charging the capacitor C1. Here, at this point, an output current from the current source I3 flows into the GND via the MOS transistor QN11 which is in the ON state. Therefore, the current from the current source I3 does not contribute to the charging of the capacitor C1.

Through the charging, a potential Cosc of the capacitor C1 rises gradually. When the potential Cosc surpasses the threshold voltage Vth12 of the comparator 30, the level of the output signal from the comparator 30 switches to the L level. Needless to say that the potential Cosc at this point has surpassed the threshold voltage Vth11. As such, the level of the output signal from the comparator 31 is in the H level. Therefore, a signal in the H level is output from the output terminal of the SR flip-flop 32.

Next, in response to the output of an H level signal from the output terminal Q of the SR flip-flop 32, the MOS transistor QN11 turns off, and the MOS transistors QN12 and QN13 are turned on by the output current from the current source I3. Hence, the potential Cosc of the of the capacitor C1 is discharged. As a result, the potential Cosc gradually decreases. When it falls below the threshold voltage Vth11 at the comparator 31, the level of the output signal from the comparator 31 switches to the L level. Needless to say that the potential Cosc at this point is less than the threshold voltage Vth12. As such, the level of the output signal from the comparator 30 is in the H level. Therefore, a signal in the L level is output from the output terminal Q of the SR flip-flop 32. By repeating the operation thus described, the output signal osc shown in FIG. 1 is output.

The oscillation frequency fosc of the oscillation circuit 7 can be derived from the following formula (3). In the formula (3), it is supposed that respective output current values of the current sources I2 and I3 are equal to each other. As is apparent from the formula (3), controlling of the output current value of the current source I2 and/or that of the current source I3 allow(s) controlling of the oscillation frequency fosc.

$$fosc=I/(2\times C1\times(Vth12-Vth11)) \qquad (3).$$

However,

I: output current values of the current source I2 and the current source I3.

Here, it is preferable that the oscillation frequency fosc be the same as the center frequency of the BPF 5 because of the following reason. Namely, the comparator 6 performs comparison using the output signal from the BPF 5, as such the frequency of the output signal from the comparator 6 is the center frequency of the BPF 5. By setting the oscillation frequency fosc of the oscillation circuit 7 to the same frequency as the center frequency of the BPF 5, the differential of timing between the respective output signals of the comparator 6 and the oscillation circuit 7 is reduced, thereby restraining malfunctions of the logic circuit 8. It is also preferable that the oscillation frequency fosc be smaller than the center frequency of the BPF 5. This is because, setting of the oscillation frequency fosc to a smaller frequency than the center frequency of the BPF 5 allows an increase in the time constant of the counter 9*a*, which performs a counting operation in response to the output signal osc from the oscillation circuit 7, without a need of increasing the number of bits of the counter 9*a*.

Figure 6:
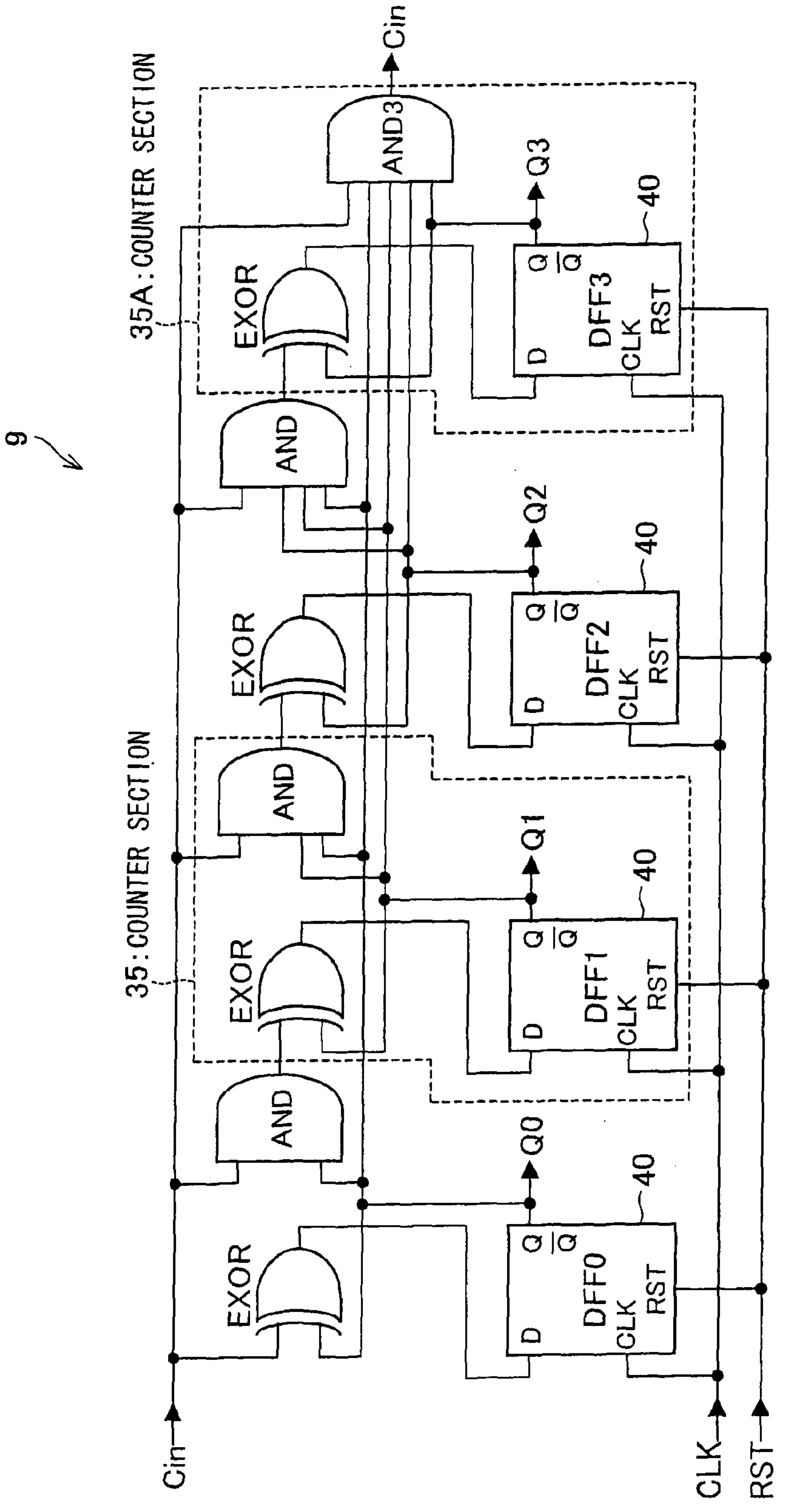
FIG. 6 is a diagram showing a specific example of configuration of a counter provided in the logic circuit.

FIG. 6 shows a specific example of a configuration of the counters 9*a* and 9*b* (Hereinafter collectively referred to as counter 9).

The counter 9 includes plural 4-bit synchronous binary counters. Each of the 4-bit synchronous binary counters includes 4 stages of counter sections 35, each stage including: an exclusive circuit (Hereinafter simply referred to as EXOR); an AND circuit (Hereinafter simply referred to as AND); and a D flip-flop (D flip-flop 40) (Hereinafter simply referred to as DFF). Note that a single 4-bit synchronous binary counter is hereinafter referred to as a set. Further, an output Q0 is an output from a DFF0, and an output Q1 is an output from a DFF1. The same goes for the other DFFs as well.

In the counter section 35 of an n th stage (where n is an integer of 1 to 4) in a set, one of input terminals of the EXOR is connected to an output terminal of the AND in the counter section 35 of the n−1 th stage. Another one of the input terminals is connected to an output terminal Q of the DFF in the n th stage. The output terminal of the EXOR is connected to an input terminal D of the DFF in the counter section 35 of the n th stage. To one of the input terminals of the EXOR in the counter section 35 of the first stage in the set, a carry signal cin from a lower order (from the preceding set) is input.

To the AND in the counter section 35 of the n th stage in the set, the carry signal cin from the lower order (preceding set), an output from the DFF of the counter section 35 of the n th stage, and the respective outputs from the DFFs of all the preceding stages (i.e. n−1 th, n−2 th . . . first stage) are input. For example, it is supposed that the counter section 35A in the figure is the counter section 35 of the n th stage. The carry signal cin from the lower order (preceding set), an output Q3 from the DFF3 in the counter section 35A, and outputs of all the DFFs in the preceding stages are input to the AND3 in the counter section 35A. The respective outputs from the DFFs of all the preceding stages in this case are: an output Q0 from a DFF0 in the first stage; an output Q1 from a DEF1 in the n−2 th stage; and an output Q2 from a DFF2 in the n−1 th stage.

Each set having the configuration as described above counts pulses from 0000 to 1111, in response to input of clock CLK. Note that the AND in the counting section 35 of the final stage (i.e., AND3) outputs a carry signal cin to a counter of an upper order (subsequent set), when the DFF output of the set is "1111". Thus, it is possible to configure a multiple-bit counter. In a case of the infrared remote control receiver 20*a*, the center frequency of the BPF 5 is 40 kHz and the pulse cycle is 25 sec, in general. Thus, according to 25 μsec× $2^{14}$=0.4096 sec, a time constant of 300 msec or more is obtained with a counter of 14 bit or more.

Figure 7:
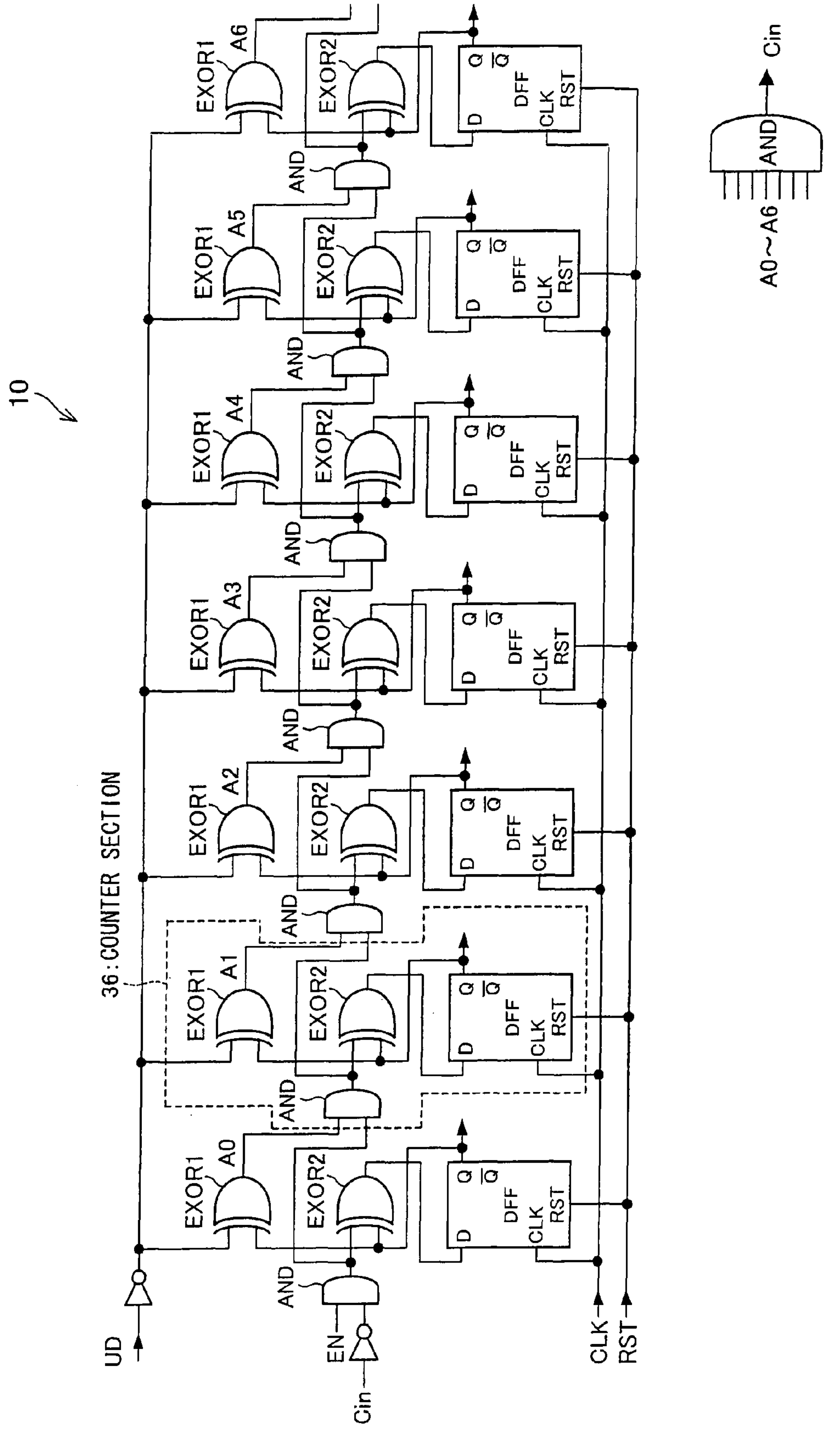
FIG. 7 is a diagram showing a specific example of configuration of a up-down counter provided in the logic circuit.

FIG. 7 shows a specific example of a configuration of the up-down counters 10*a* and 10*b* (Hereinafter collectively referred to as up-down counter 10).

The up-down counter 10 includes plural 7-bit synchronous binary counters. Each of the 7-bit synchronous binary counters includes 7 stages of counter sections 36, and an AND 5. Each counter section 36 includes: 2 EXORs, an AND, and a DFF. To the AND 5, outputs A0 to A6 respectively from EXORs 1 of all the counting sections 36 are input. Note that a single 7-bit synchronous binary counter is hereinafter referred to as a set. The AND 5 in a set outputs a carry signal Cina to a counter of an upper order (subsequent set), when outputs of the EXORs 1 of all the counter sections 36 are "1".

In a counter section 36 of the n th stage (where n is an integer of 1 to 7) in the set, a count control signal UD is input to one of input terminals of the EXOR 1, and the another one of the input terminals is connected to one of input terminals of an EXOR 2 and an output terminal Q of a DFF of the same stage. An AND in the n th stage is connected to an output terminal of an AND and an output terminal of the EXOR 1 in the n−1 th stage. The output terminal of the AND in the n th stage is connected to an input terminal of an EXOR 2 of the counter section 36 in the nth stage. The output terminal of the AND is also connected, along with an output terminal of the EXOR 1 of the counter section 36 in the n th stage, to an AND of a counter section 36 in the n+1 th stage. The output terminal of the EXOR 2 of the counter section 36 in the n th stage is connected to an input terminal D of the DDF of the counter section 36 in the n th stage. To the AND of the counter section 36 of the first stage in the set, an enable signal EN and a carry signal Cina from a lower order (preceding set) are input.

Each set having the configuration as described above counts pulses from 0000000 to 1111111, in response to input of clock CLK. Note that up-counting is performed when an H-level signal is input to the count control signal UD, and down-counting is performed when an L-level signal is input.

Here, each of the counter 9 and the up-down counter 10 has a scan path, and is able to perform a shift-register operation. In wafer test performed at a predetermined occasion, the counter 9 and the up-down counter 10 are operated by using the same clock CLK (whereas, in a normal operation other than the wafer test, the clocks are operated by using different clocks respectively). This allows easier designing of the test, and improves a failure detection rate.

Figure 8:
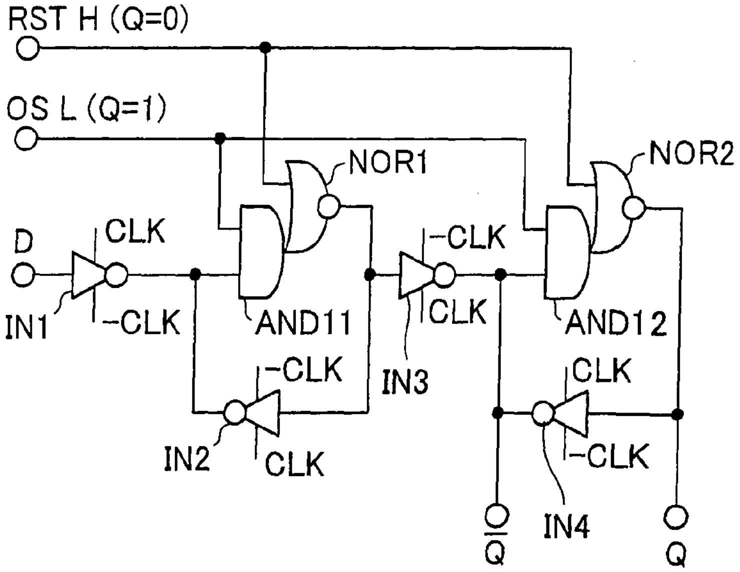
FIG. 8(*a*) is a diagram showing a specific example of configuration of a D flip-flop provided in the counter and up-down counter.
Figure 8:
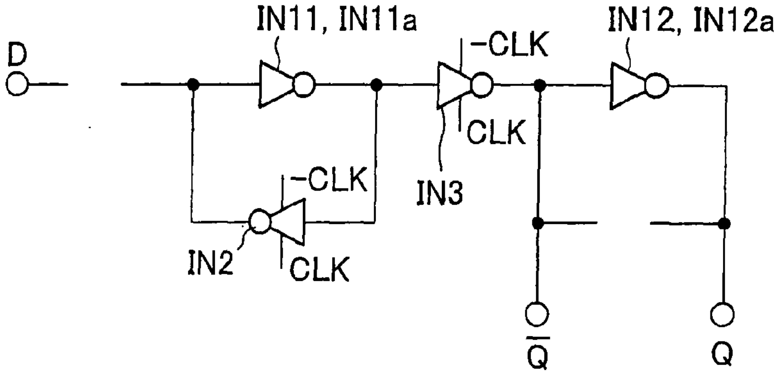
Figure 8:
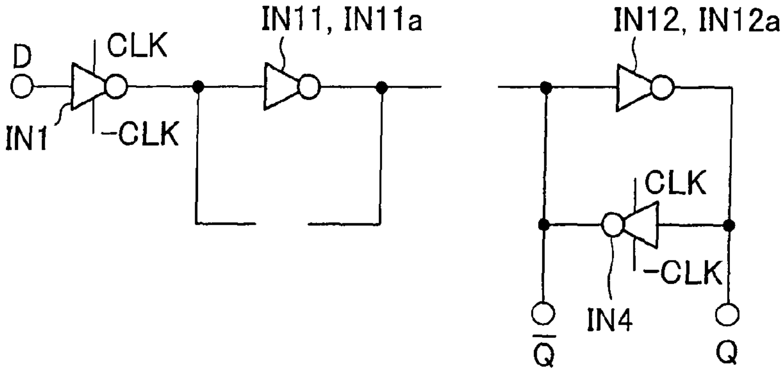

FIG. 8(*a*) shows a specific example of configuration of the DFF 40 used in the counter 9 and the up-down counter 10. FIG. 8(*b*) and FIG. 8(*c*) show an operation of the DFF 40. The DFF 40 includes: a clocked inverter (Hereinafter simply referred to as inverter IN); an AND; and a NOR circuit (Hereinafter referred to as NOR). First, connections of elements are described.

An input terminal D of the DFF 40 is connected to an inverter IN1, and an output terminal of the inverter IN1 is connected to an input terminal (second input terminal) of an AND 11. To another input terminal (first input terminal) of the AND 11, an H output setting terminal OS (initial value setting means) for setting an output of the DFF 40 is connected. An output terminal of the AND 11 is connected to an input terminal (second input terminal) of a NOR 1, and another input terminal (first input terminal) of the NOR 1 is connected to a reset terminal RST (initial value setting means) serving as an L output setting terminal for resetting the DFF 40. An output terminal of the NOR 1 is connected to an inverter IN 2, and an output terminal of the inverter IN 2 is connected to the second input terminal of the AND 11.

Further, the output terminal of the NOR 1 is connected to an inverter IN 3, and an output terminal of the inverter IN 3 is connected to an input terminal (second input terminal) of an AND 12. Another input terminal (first input terminal) of the AND 12 is connected to the H output setting terminal OS. An output terminal of the AND 12 is connected to an input terminal (second input terminal) of a NOR 2, and another input terminal of the NOR 2 is connected to the reset terminal RST. An output terminal of the NOR 2 is connected to an inverter IN 4, and an output terminal of the inverter IN 4 is connected to the output terminal of the inverter IN 3. The output terminal of the NOR 2 serves as an output terminal Q of the DFF 40, and the output terminal of the inverter IN 4 serves as an output terminal Q bar of the DFF 40.

Next, an operation of the DFF 40 is described with reference to FIG. 8(*b*) and FIG. 8(*c*). FIG. 8(*b*) shows a case where an H-level signal is input as the clock CLK, whereas FIG. 8(*c*)

shows a case where an L-level signal is input as the clock CLK. As mentioned, the DFF 40 is provided with the H output setting terminal OS and the reset terminal RST, so that it is possible to set an output of the DFF 40. Specifically, an output of the DFF 40 (output terminal Q) can be set to H level, by inputting a signal in the L level to the H output setting terminal OS. On the other hand, an output of the DFF 40 (output terminal Q) can be reset by inputting an H-level signal to the reset terminal RST: i.e., the output of DFF 40 is set to L level. Each of the cases are described below.

First described is a case of FIG. 8(*b*) where an H-level signal is input as a clock CLK, and an H-level signal is input to the reset terminal RST, so as to acquire an L-level output from the DFF 40.

See FIG. 8(*b*) for the following description. When an H-level signal is input as a clock CLK, the inverter IN1 and the inverter IN 4 enter a high-impedance state. Then, by inputting an H-level signal to the reset terminal RST, the signal is input to the first input terminal of NOR 1. Hence, no matter what level the output from the AND 11 is, the output from the NOR 1 is in the L level. Therefore, the AND 11 and NOR 1 can be regarded as an inverter whose output is in the L level (IN 11 in the figure). Similarly, the AND 12 and the NOR 2 can be regarded as an inverter whose output is in the L level (IN 12 in the figure). Thus, an L-level output is acquired from the DFF 40.

Next described is a case of FIG. 8(*c*) where an L-level signal is input as a clock CLK, and an H-level signal is input to the reset terminal RST, so as to acquire an L-level output from the DFF 40.

In this case, the inverter IN 2 and the inverter IN 3 enter the high-impedance state. The AND 11 and NOR 1 can be regarded as IN 11 whose output is in the L level, and the AND 12 and the NOR 2 can be regarded as the inverter IN 12 whose output is in the L level. Thus, an L-level output is acquired from the DFF 40.

Next described is a case of FIG. 8(*b*) where an H-level signal is input as a clock CLK, and an L-level signal is input to H output setting terminal OS, so that an H-level output is acquired from the DFF 40.

As shown in FIG. 8(*b*), the inverters IN 1 and IN 4 enter the high-impedance state, when an H-level signal is input as a clock CLK. Then, by inputting an L-level signal to the H output setting terminal OS, an L-level signal is input to the first input terminal of the AND 11. As a result, the output from the AND 11 is in the L level without fail. Since an L-level signal is input from the reset terminal RST to the first input terminal NOR 1, the output of the NOR 1 is in the H level without fail. As a result, the AND 11 and NOR 1 can be regarded as a single inverter (IN 11*a* in the figure) whose output is in the H level. Similarly, the AND 12 and NOR 2 can be regarded as a single inverter (IN 12*a* in the figure) whose output is in the H level. Thus, an H-level output is acquired from the DFF 40.

Next described is a case of FIG. 8(*c*) where an L-level signal is input as a clock CLK, and an L-level signal is input to the H-output setting terminal OS, so as to acquire an H-level output from the DFF 40.

In this case, the inverters IN 2 and IN 3 enter the high-impedance state. Thus, the AND 11 and NOR 1 can be regarded as IN 11*a* whose output is in the H level. Further, the AND 12 and NOR2 can be regarded as an inverter IN 12*a* whose output is in the H-level. Thus, an H-level output is acquired from the DFF 40.

As described, the output of the DFF 40 can be set by inputting an L-level signal to the H output setting terminal OS or inputting an H-level signal to the reset terminal RST. Through this, it is possible to set the gain of the amplifier 4, and set the gain and Q-value of the BPF 5 at the time of turning-on the power. This allows the gain of the amplifier 4 and the gain and Q-value of the BPF 5 to be respectively set to values which are suitable for the use environment. Hence, an infrared remote control receiver 20*a* which is adaptable for various use environments is realized.

Embodiment 2

Figure 9:
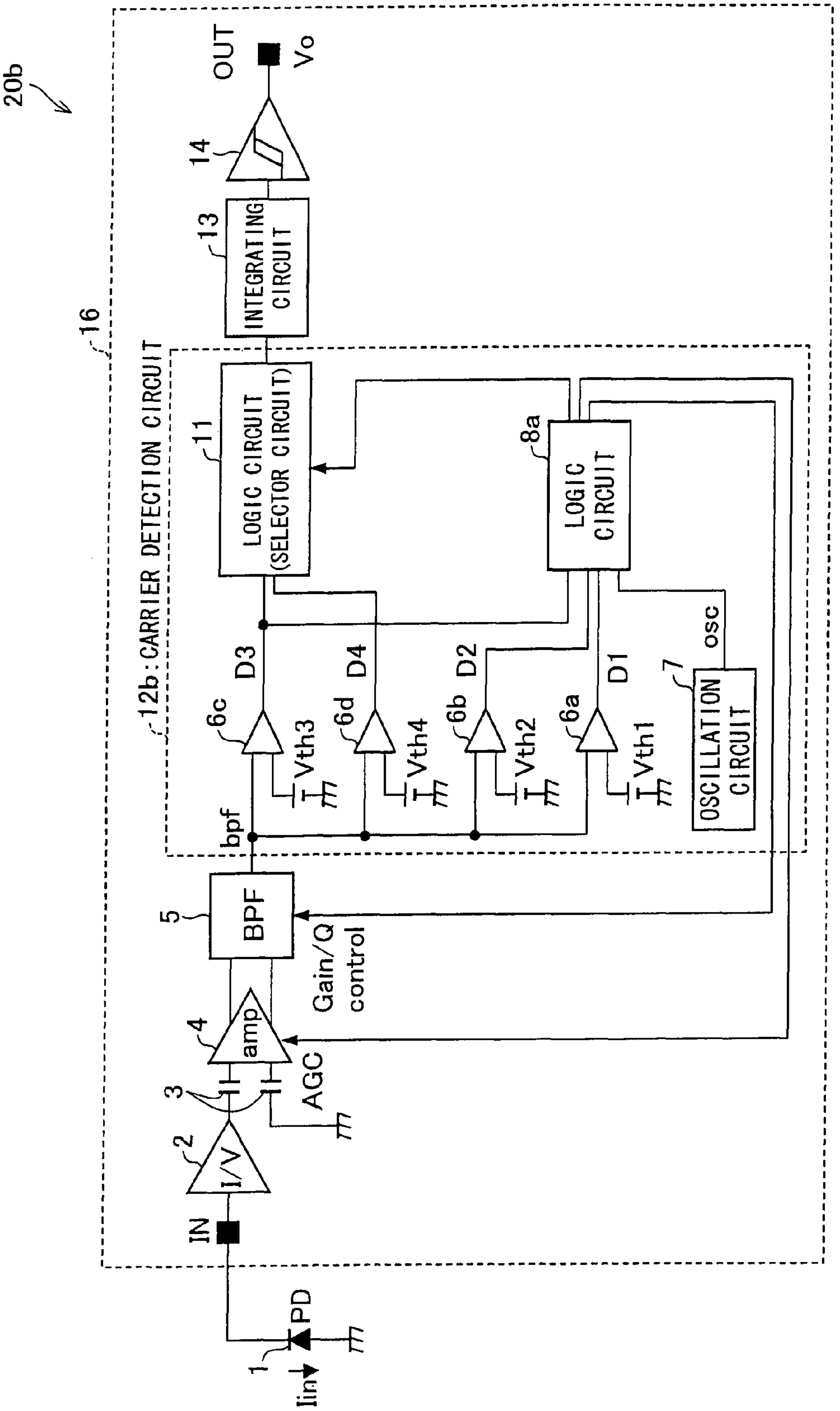
FIG. 9 is a diagram showing an exemplary configuration of an infrared remote control receiver of another embodiment, in accordance with the present invention.
Figure 10:
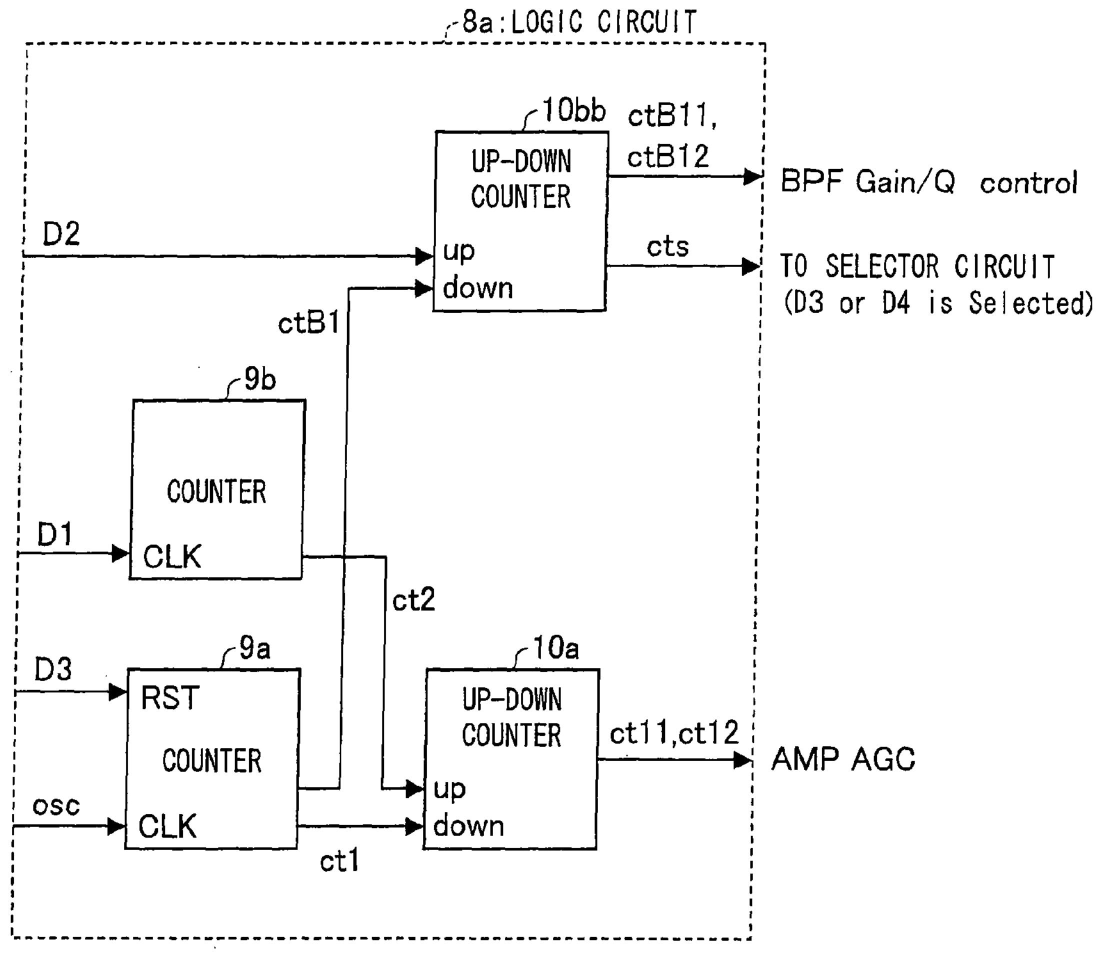
FIG. 10 is a block diagram showing an exemplary configuration of a logic circuit provided in the infrared remote control receiver of the other embodiment.
Figure 11:
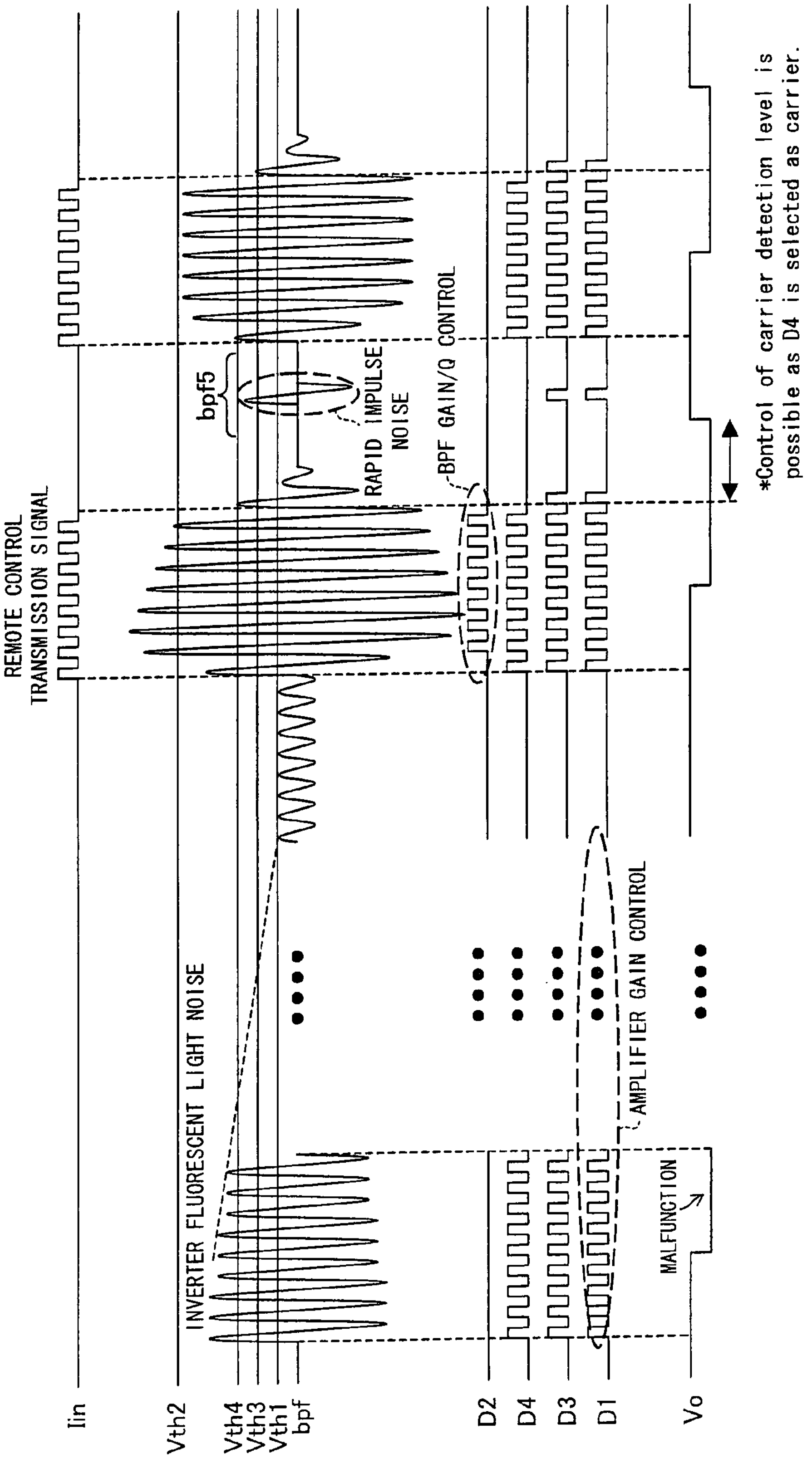
FIG. 11 is a diagram showing operational waveforms of circuits in the infrared remote control receiver of the other embodiment.

The following describes another embodiment of the present invention, with reference to FIG. 9 to FIG. 11.

FIG. 9 shows an exemplary configuration of an infrared remote control receiver 20*b*. Note that members with the same reference numerals as those of the foregoing infrared remote control receiver 20*a* shown in FIG. 1 have the same functions, and explanations for these members are therefore omitted here.

The configuration of the infrared remote control receiver 20*b* is different from that of the infrared remote control receiver 20*a* in that the infrared remote control receiver 20*b* is provided with a carrier detection circuit 12*b*, instead of the carrier detection circuit 12*a*.

The carrier detection circuit 12*b* is different from the carrier detection circuit 12*a* in that the carrier detection circuit 12*b* includes a comparator 6*d* (fourth comparing circuit), a logic circuit 8*a* (instead of the logic circuit 8), and a selector circuit 11. To one of input terminals of the comparator 6*d*, an output signal bpf from the BPF 5 is input. To another one of the input terminals, a threshold voltage Vth4 (fourth threshold voltage) which is a second signal detection level (a second carrier detection level) is input.

The threshold voltages Vth1 to Vth4 have a relation of: Vth1<Vth3<Vth4<Vth2.

FIG. 10 shows an exemplary configuration of the logic circuit 8*a*.

Although the configuration of the logic circuit 8*a* is substantially the same as the logic circuit 8; however, the logic circuit 8*a* includes an up-down counter 10*bb* instead of the up-down counter 10*b*. The up-down counter 10*bb* controls the BPF 5 as is done by the up-down counter 10*b*, and also controls the selector circuit 11. More specifically, when an output signal D2 from the comparator 6*b* is input, the up-down counter 10*bb* outputs a selector control signal cts to the selector circuit 11.

The selector circuit 11 receives the output signal D3 from the comparator 6*c* and an output signal D4 from the comparator 6*d*, and selects therefrom a carrier. The carrier is selected based on the selector control signal output from the up-down counter 10*bb* in the logic circuit 8*a*. The output signal D4 of the comparator 6*d* is selected as the carrier when the selector control signal cts is input.

When the output signal D2 of the comparator 6*b* is output: i.e., when it is judged that the level of the output signal bpf from the BPF 5 is not suitable for a remote control transmission signal, and that a problem such as an increase in the pulse width of the output signal D3 of the comparator 6*c* may occur, the output signal D4 of the comparator 6*d* is output as the carrier to the subsequent stage. Thus, outputting of suitable carrier for the remote control transmission signal is possible.

Further, since the output carrier is the output signal D4 of the comparator 6*d* which signal has been acquired as a result of the comparison with the threshold voltage Vth4 higher than the threshold voltage Vth3, it is possible to further restrain the malfunctions attributed to the fluorescent light noise.

Further, the configuration of the Embodiment 2 is capable of handling a case where fluorescent light noise is suddenly generated while remote control transmission signals are input; e.g. where a fluorescent light is suddenly turned on. See FIG. 11 for the explanation below. FIG. 11 shows respective operational waveforms of the circuits in the infrared remote control receiver 20*b*, in a case where the fluorescent light noise occurs.

As shown in the figure, even if the fluorescent light noise suddenly occurs (signal bpf 5 in the figure), the output signal D2 from the comparator 6*b* is output before the occurrence of the noise. Therefore, the selector circuit 11 outputs as the carrier the output signal D4 of the comparator 6*d* to which a higher threshold voltage is input. Thus, it is possible to restrain malfunctions attributed to the sudden occurrence of the fluorescent light noise.

Embodiment 3

Each of Embodiments 1 and 2 deals with a case where the present invention is applied to an infrared remote control receiver. The present embodiment however deals with a case where the present invention is applied to an IrDA control. Note that the operations of the gain control and the like are the same as those described in Embodiments 1 and 2, therefore explanations for these operations are omitted here. Further, the present embodiment only describes a case of adopting the configuration of Embodiment 1; however, it is needless to say that the configuration of Embodiment 2 is also adoptable.

Figure 12:
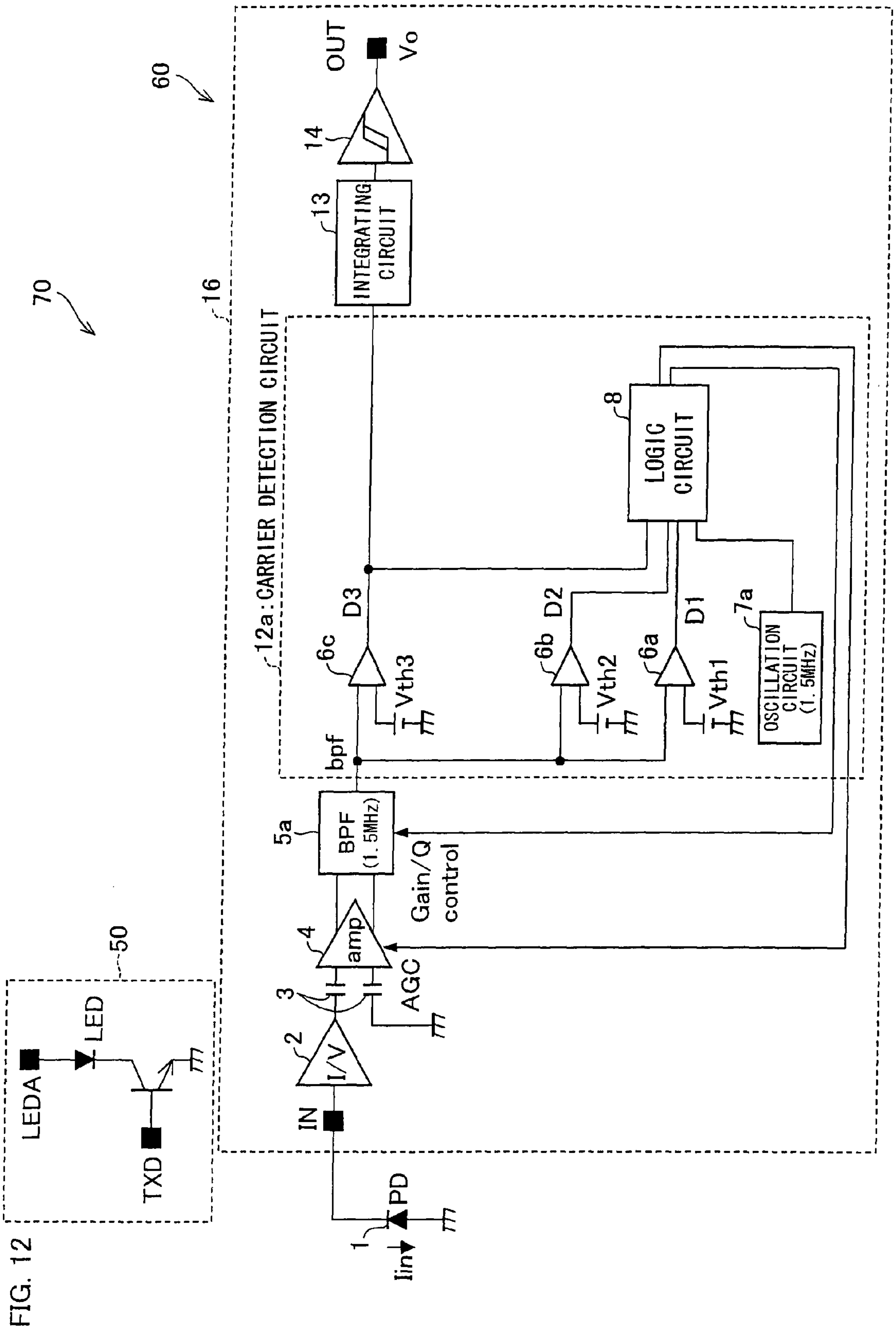
FIG. 12 is a diagram showing an exemplary configuration of an IrDA control of the other embodiment, in accordance with the present invention.

FIG. 12 shows a configuration of an IrDA control 70. Note that members with the same reference numerals as those of the foregoing infrared remote control receiver 20*a* shown in FIG. 1 have the same functions, and explanations for these members are therefore omitted here.

The IrDA Control 70 includes a transmission section 50 and a reception section 60. The transmission section 50 includes an LED and a drive circuit therefor. The reception section 60 has the similar configuration as that of the infrared remote control receiver 20*a*. However, since the subcarrier of the IrDA control is 1.5 MHz, the reception section 60 includes: a BPF 5*a* (serving as the BPF 5) whose center frequency is 1.5 MHz; and an oscillation circuit 7*a* (serving as the oscillation circuit 7) whose oscillation frequency fosc is 1.5 MHz.

With an infrared signal processing circuit of the present invention which is described in the above embodiments, problems in a conventional configuration do not take place. This point is described hereinbelow.

First, the data transferring system disclosed in Patent citation 1 is provided with a certain period range T check. The system judges whether received signal is an infrared signal or noise, according to whether or not a halt period Td occurred within the period range T check. If the signal received is judged as to be noise, an amplifier is controlled. However, an infrared signal can vary depending on makers, and there are more than ten different kinds of infrared signals: e.g., NEC codes, Sony codes, RCMM codes, etc. Thus, some infrared signals are not adaptable to the halt period Td of the data transferring system, and the system is not able to receive those inadaptable infrared signals. The system is not able to handle sudden occurrence of noise due to its slow gain adjustment speed, as is pointed out in Patent citation 5 (Japanese Unexamined Patent Publication No. 60410/2006 (Tokukai 2006-60410; Published on Mar. 2, 2006)).

However, unlike the system of Patent citation 1, the infrared remote control receiver 20*a* for example is not configured to detect an infrared signal pattern. Therefore, the infrared remote control receiver 20*a* is able to handle various kinds of infrared signals. Furthermore, the infrared remote control receiver 20*b* having the selector circuit 11 is able to handle a case of sudden occurrence of noise.

Further, Patent document 2 discloses a receiver circuit which demodulates an output signal from a BPF, and which controls an amplifier and the BPF, using the demodulated signal as a trigger. However, this receiver circuit has the following problem. Namely, when noise from fluorescent light having a high illuminance enters the receiver circuit, the output signal of the BPF is saturated by the noise. This causes the demodulated signal to be constantly in the L level. Due to this, the demodulated signal does not function as the trigger, and as the result, the amplifying circuit and bandpass filter are not controlled.

On the other hand, for example, the infrared remote control receiver 20*a* performs control prompted by an output signal from the comparing circuit 6, which signal is obtained as a result of comparison with the output signal bpf from the BPF 5. This output signal of the comparing circuit 6 needed for performing the control is acquired as long as the BPF 5 is oscillating. Therefore, it is possible to avoid the problem of Patent citation 2 that the amplifier and BPF are not controlled.

Figure 13:
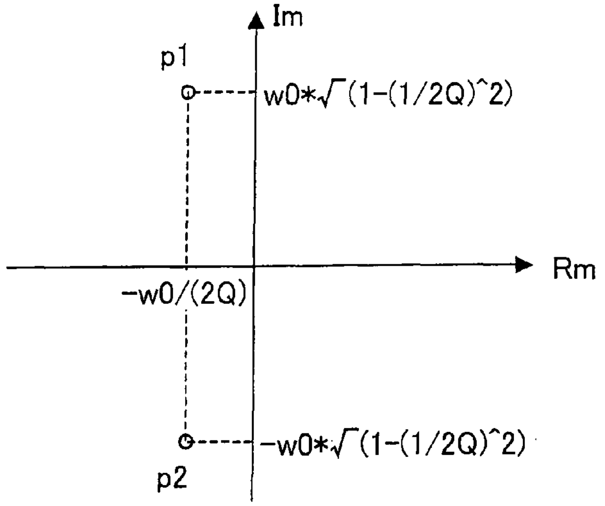
FIG. 13(*a*) is a diagram explaining the stability of the BPF.
Figure 13:
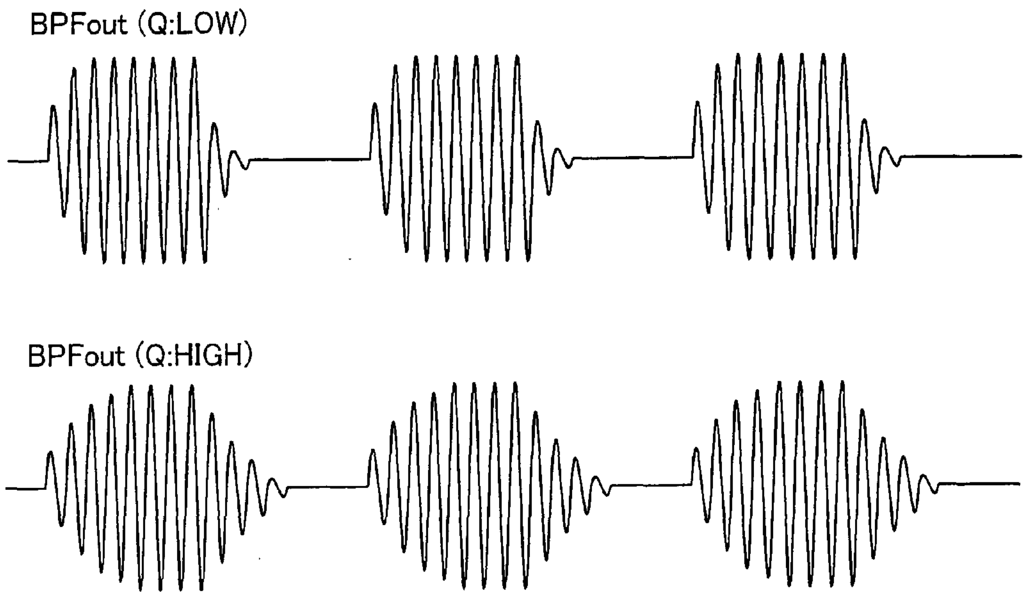

Further, Patent citation 3 discloses a remote control light receiving device which detects an output signal of a BPF and which reduces noise by increasing the Q-value of the BPF. However, an increase of the Q-value causes a problem such as the follows: deterioration in stability of the BPF; and/or deterioration of the reception sensitivity due to increase in waveform distortion of the output signal bpf of the BPF. This is explained in detail with reference to FIG. 13(*a*) and FIG. 13(*b*). FIG. 13(*a*) shows a pole assignment of the BPF, and FIG. 13(*b*) shows an output signal waveform of the BPF, at the time of inputting a remote control transmission signal.

First described is the stability of the BPF. Formula (4) shows the transfer function of the BPF, and Formula (5) shows the polarities p1 and p2 of the BPF.

$$H(s)=(H\times\omega 0s/Q)/(s^2+\omega 0s/Q+\omega 0^2) \tag{4}$$

$$p1=(-\omega 0/2/Q,\omega 0(1-(\tfrac{1}{2}Q)^2)^{1/2})$$

$$p2=(-\omega 0/2/Q,-\omega 0(1-(\tfrac{1}{2}Q)^2)^{1/2}) \tag{5}$$

As shown in FIG. 13(*a*), the polarity assignment approaches to the right half plane, by increasing the Q-value of the BPF. As the result, in a negative feedback circuit, the BPF is made unstable according to Nyquist stability criterion which says a system is destabilized when the polarity assignment is in the right half plane.

Next described is the distortion of the waveform in the output signal of the BPF. A sine wave response of the BPF is obtained as follows. Namely, where Laplace transform of sine wave is as presented in Formula (6), the sine wave response of the BPF is obtained by performing reverse-Laplace transform of H(S)F(S) (Formula (7)).

$$F(s)=L(\sin(\omega 0t))=\omega 0/(s^2+\omega 0^2) \tag{6}$$

$$L^{-1}(H(s)F(s))=H(1-\exp(-\omega 0t/2/Q))\sin(\omega 0t) \tag{7}$$

It is found that the waveform distortion increases with an increase in the Q-value, since the (1−exp(−ω0t/2/Q)) in Formula (7) influences the waveform distortion. The increase in the waveform distortion in the output signal of the BPF causes deterioration in the reception sensitivity. Especially, when the pulse width of the base frequency of the remote control transmission signal is small, the waveform distortion is relatively increased. Accordingly, the Q-value of the BPF is set to approximately 10 to 15 in general.

However, in the infrared remote control receiver 20*a* for example, the gain of the amplifier 4 and the gain and Q-value of the BPF 5 are judged as to be large, when the output signal D2 is output from the comparator 6*b*, and the BPF 5 is rapidly controlled so that the gain and Q-value of the BPF 5 are reduced. Thus, the above mentioned problems are avoided.

Further, Patent citation 4 (Japanese Unexamined Patent Publication No. 331076/1999 (Tokukaihei 11-331076; Published on Nov. 30, 1999)) discloses an infrared signal processing circuit which generates a reference level voltage for detecting a carrier, by using a noise level voltage or the like detected.

In the infrared signal processing circuit, the reception sensitivity drops with variation in the reference voltage level at the time of inputting an infrared signal.

Thus, it is necessary to smoothen the reference voltage level with a use of an integrating circuit whose time constant is large. This necessitates a capacitor with a large capacitance in the integrating circuit built of the infrared signal processing circuit. Therefore, the chip-size is increased, consequently increasing the costs.

However, in the infrared remote control receiver 20*a* for example, a large time constant can be set in the logic circuit 8. Therefore, it is possible to reduce the capacitance of the capacitor in the integrating circuit.

Further, Patent citation 5 discloses a gain adjustment circuit which reduces its time constant so as to handle sudden generation of fluorescent light noise. In this case, however, since the time constant of the gain adjustment circuit is small, the reception sensitivity is deteriorated.

In the infrared remote control receiver 20*b*, on the other hand, the carrier detection level is suitably modified by the selector circuit 11. This restrains, while avoiding deterioration of the reception sensitivity, malfunctions attributed to sudden occurrence of fluorescent light noise.

Here, an increase in the Q-value of a bandpass filter destabilizes the bandpass filter, and/or increases the waveform distortion of the output signal from the band pass filter. Thus, the reception sensitivity is deteriorated. These problems also occur in the remote control light receiving device of Patent citation 3 which reduces noise by detecting the output signal of a bandpass filter and increasing the Q-value thereof.

In view of that, the carrier detection circuit of the present embodiment may further include a third comparing circuit for, comparing (i) an output signal from the bandpass filter with (ii) a third threshold voltage which is a peak detection level for judging the level of the output signal from the bandpass filter, and whose level is higher than the second threshold voltage, wherein said logic circuit controls, based on an output signal from said third comparing circuit, the gain and Q-value of the bandpass filter so that an output signal from said third comparing circuit is not output.

In the configuration, the carrier detection circuit includes the third comparing circuit. When an output signal is output from the third comparing circuit, the gain and Q-value of the bandpass filter is judged as to be large, and the gain and the Q-value of the bandpass filter is controlled. Thus, it is possible to improve the stability of the bandpass filter, and to restrain the deterioration of the reception sensitivity caused by the waveform distortion.

The carrier detection circuit of the present embodiment preferably adapted so that said logic circuit includes a plurality of counters each of which (i) counts pulses of output signals from one of said comparing circuits, and (ii) outputs, when a predetermined number of the pulses are counted, a pulse for controlling the amplifying circuit or the bandpass filter. Furthermore, in addition to the above configuration, the carrier detection circuit of the present invention may include an oscillation circuit for oscillating clock signals, wherein said logic circuit includes: a first counter which counts clock signals from the oscillation circuit and outputs (i) first amplifying circuit control signals for use in increasing the gain of the amplifying circuit, and (ii) bandpass filter control signals for use in increasing the gain and Q-value of the bandpass filter; a second counter which counts the output signals from the first comparing circuit and outputs second amplifying circuit control signals for use in decreasing the gain of the amplifying circuit, the second counter being one of said plurality of counters; a first up-down counter which (i) counts the first amplifying circuit control signals and outputs a first control signal for causing an increase in the gain of the amplifying circuit, and (ii) counts the second amplifying circuit control signals and outputs a second control signal for causing a decrease in the gain of the amplifying circuit; a second up-down counter which (i) counts the bandpass filter control signals and outputs a third control signal for causing increase in the gain and Q-value of the bandpass filter, and (ii) counts output signals from the third comparing circuit and outputs a fourth control signal for causing decrease in the gain and Q-value of the band pass filter, the second counter being one of said plurality of counters.

In the above configuration, since the carrier detection circuit includes a digital circuit, it is possible to reduce the chip size. Consequently, cost reduction is also possible.

Patent citation 4 discloses an infrared signal processing circuit which uses a noise level voltage or the like having been detected to generate a reference level voltage for detecting a carrier. Here, the reception sensitivity deteriorates with variation in the reference voltage level at the time of inputting an infrared signal. Thus, it is necessary to smoothen the reference voltage level with a use of an integrating circuit whose time constant is large. This necessitates a capacitor with a large capacitance in the integrating circuit built of the infrared signal processing circuit. Because of this, the chip-size is increased, consequently increasing the cost.

However, in the carrier detection circuit, the counter allows setting of a large time constant. Therefore, the capacitance of the capacitor in the integrating circuit can be reduced. A large time constant of the counter can be set by, for example, enlarging the time constant of the first amplifying circuit control signal to be input to the first up-down counter. Furthermore, since it is possible to set a large time constant, a rapid variation of the gain can be prevented. Therefore, a stable reception sensitivity is achieved at the time of inputting an infrared signal.

In addition to the above configuration, the carrier detection circuit of the present embodiment may adapted so that the output signals from the second comparing circuit are input to a reset terminal of the first counter.

In the configuration, the output signal from the second comparing circuit is input to the reset terminal of the first counter. Therefore, the operation of the first counter is stopped, while the output signal from the second comparing circuit is output. Accordingly, the control for increasing the gain of the amplifying circuit, and the control of increasing the gain and the Q-value of the bandpass filter are not performed, and only the control for reducing the gain of the amplifying circuit is performed. As the result, the variation of the gain can be made small, and a stable reception sensitivity at the time of inputting an infrared signal is achieved. Further, since only the control for reducing the gain of the amplifying circuit is performed, malfunctions attributed to the disturbance light noise can be restrained.

The carrier detection circuit of the present embodiment may be adapted so that said first up-down counter includes a first initial value setting section for setting an initial value of the gain of the amplifying circuit; and said second up-down counter includes a second initial value setting section for setting an initial value of the gain and Q-value of the bandpass filter.

In the configuration, the first up-down counter has the first initial value setting function for setting the initial value of the gain of the amplifying circuit. Further, the second up-down counter has a second initial value setting function for setting respective initial values of the gain and the Q-value of the bandpass filter. With this configuration, it is possible to set the initial values to suitable values for a use environment. Hence, an infrared signal processing circuit which is suitably adaptable for various use environments is realized.

The carrier detection circuit of the present embodiment may be adapted so that each of said counters and up-down counters has a scan path, and during a predetermined occasion, said counters and up-down counters operate in response to a single clock.

In the configuration, each of the plural counters and plural up-down counters are provided with a scan path. Therefore, the counters and up-down counters are able to perform a shift-register operation. Then, in wafer test performed at a predetermined occasion, the counters and the up-down counters are operated by using the same clock CLK. This allows easier designing of the test, and improves a failure detection rate.

The carrier detection circuit of the present embodiment may be adapted so that said comparing circuit is a hysteresis comparator.

In the above configuration, the comparing circuit is a hysteresis comparator.

Therefore, even when the output signal from the bandpass filter is nearby the threshold voltages, it is possible to increase the pulse width of the output signal from the comparing circuit. Thus, the operation in the logic circuit is triggered without fail.

The carrier detection circuit of the present embodiment may be adapted so that an oscillation frequency of the oscillation circuit is identical to a center frequency of the bandpass filter. The carrier detection circuit of the present embodiment may be adapted so that an oscillation frequency of the oscillation circuit is smaller than a center frequency of the bandpass filter.

Since the plural comparing circuits perform comparison of the output signal of the bandpass filter, the frequency of the output signal is the center frequency of the bandpass filter.

Accordingly, by setting the oscillation frequency of the oscillation circuit to the same frequency as the center frequency of the bandpass filter, it is possible to reduce a time difference between the bandpass filter and the comparing circuits. As a result, malfunctions of the logic circuit are restrained.

Further, by setting the oscillation frequency of the oscillation circuit to a frequency smaller than the center frequency of the bandpass filter, it is possible to increase the time constant of each counter which performs counting operation in response to the output signal from the oscillation circuit (clock signal), while avoiding increasing the number of bits in the counter.

The carrier detection circuit of the present embodiment may further include: a fourth comparing circuit which compares (i) the output signal from the bandpass filter with (ii) a forth threshold voltage which is a second carrier detection level, and whose level is higher than the second threshold voltage; and a selector circuit for selecting as a carrier the output signal from said second comparing circuit or an output signal from said fourth comparing circuit.

In the configuration, the carrier detection level is suitably modified. For example, when an output signal is output from the third comparing circuit: i.e., when it is judged that the output signal from the bandpass filter is not suitable for the received remote control transmission signal, and that a problem such as an increase in the pulse width of the output signal from the second comparing circuit may occur, the selector circuit selects as the carrier the output signal from the fourth comparing circuit which signal obtained as a result of comparison with the threshold voltage whose level is higher than the second threshold voltage. Thus, it is possible to output a suitable carrier for the received remote control transmission signal. Further, it is possible to restrain malfunctions attributed to the fluorescent light noise.

Further, as mentioned above, modification of the carrier detection level allows the carrier detection circuit to handle a case where fluorescent light noise abruptly enters at the time of inputting infrared signals. Thus, it is possible to restrain malfunction caused by sudden-generated fluorescent light noise.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A carrier detection circuit for performing carrier detection, comprising:

a first comparing circuit;

a second comparing circuit; and a logic circuit, wherein:

said carrier detection circuit is for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component;

said first comparing circuit compares (i) an output signal of the bandpass filter with (ii) a first threshold voltage which is a noise detection level;

said second comparing circuit compares (i) the output signal of the bandpass filter with (ii) a second threshold voltage which is a first carrier detection level, and whose level is higher than that the first threshold voltage; and said logic circuit outputs as the carrier an output signal of said second comparing circuit, and controls the gain of the amplifying circuit based on the output signal of said first comparing circuit so that the output signal of said first comparing circuit is not output.

2. The carrier detection circuit as set forth in claim 1, further comprising:

a third comparing circuit for comparing (i) an output signal from the bandpass filter with (ii) a third threshold voltage which is a peak detection level for judging the level of the output signal from the bandpass filter, and whose level is higher than the second threshold voltage, wherein said logic circuit controls, based on an output signal from said third comparing circuit, the gain and Q-value of the bandpass filter so that an output signal from said third comparing circuit is not output.

3. The carrier detection circuit as set forth in claim 2, wherein:

said logic circuit includes a plurality of counters each of which (i) counts pulses of output signals from one of said comparing circuits, and (ii) outputs, when a predetermined number of the pulses are counted, a pulse for controlling the amplifying circuit or the bandpass filter.

4. The carrier detection circuit as set forth in claim 3, further comprising:

an oscillation circuit for oscillating clock signals, wherein said logic circuit includes:

a first counter which counts clock signals from the oscillation circuit and outputs (i) first amplifying circuit control signals for use in increasing the gain of the amplifying circuit, and (ii) bandpass filter control signals for use in increasing the gain and Q-value of the bandpass filter;

a second counter which counts the output signals from the first comparing circuit and outputs second amplifying circuit control signals for use in decreasing the gain of the amplifying circuit, the second counter being one of said plurality of counters;

a first up-down counter which (i) counts the first amplifying circuit control signals and outputs a first control signal for causing an increase in the gain of the amplifying circuit, and (ii) counts the second amplifying circuit control signals and outputs a second control signal for causing a decrease in the gain of the amplifying circuit;

a second up-down counter which (i) counts the bandpass filter control signals and outputs a third control signal for causing increase in the gain and Q-value of the bandpass filter, and (ii) counts output signals from the third comparing circuit and outputs a fourth control signal for causing decrease in the gain and Q-value of the band pass filter, the second counter being one of said plurality of counters.

5. The carrier detection circuit as set forth in claim 4, wherein the output signals from the second comparing circuit are input to a reset terminal of the first counter.

6. The carrier detection circuit as set forth in claim 4, wherein:

said first up-down counter includes a first initial value setting section for setting an initial value of the gain of the amplifying circuit; and said second up-down counter includes a second initial value setting section for setting an initial value of the gain and Q-value of the bandpass filter.

7. The carrier detection circuit as set forth in claim 4, wherein:

each of said counters and up-down counters has a scan path, and during a predetermined occasion, said counters and up-down counters operate in response to a single clock.

8. The carrier detection circuit as set forth in claim 2, wherein at least one of said first, said second, and said third comparing circuits is a hysteresis comparator.

9. The carrier detection circuit as set forth in claim 4, wherein an oscillation frequency of the oscillation circuit is identical to a center frequency of the bandpass filter.

10. The carrier detection circuit as set forth in claim 4, wherein an oscillation frequency of the oscillation circuit is smaller than a center frequency of the bandpass filter.

11. The carrier detection circuit as set forth in claim 2, further comprising:

a fourth comparing circuit which compares (i) the output signal from the bandpass filter with (ii) a forth threshold voltage which is a second carrier detection level, and whose level is higher than the second threshold voltage; and a selector circuit for selecting as a carrier the output signal from said second comparing circuit or an output signal from said fourth comparing circuit.

12. An infrared signal processing circuit, comprising:

a photo-acceptance element for converting an infrared signal received into an electric signal;

an amplifying circuit for amplifying the electric signal;

a bandpass filter for extracting a carrier frequency component from the electric signal having been amplified;

a carrier detection circuit for detecting a carrier from the extracted carrier frequency component; and an integrating circuit for integrating the carrier detected in the carrier frequency component, wherein said carrier detection circuit includes:

a first comparing circuit which compares (i) an output signal of the bandpass filter with (ii) a first threshold voltage which is a noise detection level;

a second comparing circuit which compares (i) the output signal of the bandpass filter with (ii) a second threshold voltage which is a first carrier detection level, and whose level is higher than that the first threshold voltage; and a logic circuit which outputs as the carrier an output signal of said second comparing circuit, and controls a gain of the amplifying circuit based on the output signal of said first comparing circuit so that the output signal of said first comparing circuit is not output.

13. The infrared signal processing circuit as set forth in claim 12, wherein:

said carrier detection circuit further includes a third comparing circuit for comparing (i) an output signal from the bandpass filter with (ii) a third threshold voltage which is a peak detection level for judging the level of the output signal from the bandpass filter, and whose level is higher than the second threshold voltage; and said logic circuit controls, based on an output signal from said third comparing circuit, the gain and Q-value of the bandpass filter so that an output signal from said third comparing circuit is not output.

14. A method of controlling a carrier detection circuit for performing carrier detection which circuit is for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component; said method comprising the steps of:

comparing in a first comparing circuit (i) an output signal from the bandpass filter with a first threshold voltage which is a noise detection level;

comparing in a second comparing circuit (i) the output signal of the bandpass filter with (ii) a second threshold voltage which is a first carrier detection level, and whose level is higher than that the first threshold voltage; and controlling with a use of a logic circuit the gain of the amplifying circuit based on the output signal from the first comparing circuit so that the output signal from the first comparing circuit is not output; and outputting from the logic circuit the output signal from the second comparing circuit as a carrier.

15. A carrier detection circuit for performing carrier detection, comprising:

a first comparing circuit;

a second comparing circuit;

an oscillation circuit for oscillating clock signals; and a logic circuit, wherein:

said carrier detection circuit is for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component;

said first comparing circuit compares (i) an output signal of the bandpass filter with (ii) a first threshold voltage which is a noise detection level;

said second comparing circuit compares (i) the output signal of the bandpass filter with (ii) a second threshold voltage which is a first carrier detection level, and whose level is higher than that the first threshold voltage; and said logical circuit includes:

a first counter which counts clock signals from the oscillation circuit, and (i) outputs, when a first predetermined number of the pulses are counted, first amplifying circuit control signals for use in increasing the gain of the amplifying circuit and (ii) outputs, when a second predetermined number of the pulses are counted, bandpass filter control signals for use in increasing the gain and Q-value of the bandpass filter;

a second counter which counts the output signals from the first comparing circuit and outputs, when a third predetermined number of the pulses are counted, second amplifying circuit control signals for use in decreasing the gain of the amplifying circuit;

a first up-down counter which (i) counts the first amplifying circuit control signals and outputs a first control signal for causing an increase in the gain of the amplifying circuit, and (ii) counts the second amplifying circuit control signals and outputs a second control signal for causing a decrease in the gain of the amplifying circuit; and a second up-down counter which counts the bandpass filter control signals and outputs a third control signal for causing increase in the gain and Q-value of the bandpass filter, an output signal from the second comparing circuit is input to a reset terminal of the first counter, the logical circuit controls the gain of the amplifying circuit with use of the first control signal and the second control signal so that the output signal of said first comparing circuit is not output and controls the gain and Q-value of the bandpass filter with use of the third control signal, and the output signal of said second comparing circuit is the carrier.

16. The carrier detection circuit as set forth in claim 15, further comprising:

a third comparing circuit for comparing (i) an output signal from the bandpass filter with (ii) a third threshold voltage which is a peak detection level for judging the level of the output signal from the bandpass filter, and whose level is higher than the second threshold voltage, wherein said second up-down counter counts output signals from the third comparing circuit and outputs a fourth control signal for causing decrease in the gain and Q-value of the band pass filter, and said logic circuit controls, with use of the fourth control signal, the gain and Q-value of the bandpass filter so that an output signal from said third comparing circuit is not output.

17. The carrier detection circuit as set forth in claim 16, wherein:

the first predetermined number of the pulses is larger than the second predetermined number of the pulses and the third predetermined number of the pulses, and the third predetermined number of the pulses is larger than the second predetermined number of the pulses, a time constant, for controlling the gain of the amplifying circuit, which is set in the first counter and the second counter is 300 msec or more, and a time constant, for controlling the gain and Q-value of the bandpass filter, which is set in the first counter and the second up-down counter is 300 msec or less.

18. The carrier detection circuit as set forth in claim 15, wherein:

said first up-down counter includes initial value setting means for setting an output of a D flip-flop provided in said first up-down counter, the initial value setting means setting the output of the D flip-flop and controlling an output signal of said first up-down counter so as to set an initial value of the gain of the amplifying circuit; and said second up-down counter includes initial value setting means for setting an output of a D flip-flop provided in said second up-down counter, the initial value setting means setting the output of the D flip-flop and controlling an output signal of said second up-down counter so as to set an initial value of the gain and Q-value of the bandpass filter.

19. The carrier detection circuit as set forth in claim 15, wherein:

each of said counters and up-down counters has a scan path, and said counters and up-down counters operate in response to a single clock so that designing of test of said counters and up-down counters becomes easy.

20. The carrier detection circuit as set forth in claim 16, wherein said comparing circuit is a hysteresis comparator.

21. The carrier detection circuit as set forth in claim 16, wherein an oscillation frequency of the oscillation circuit is identical to a center frequency of the bandpass filter.

22. The carrier detection circuit as set forth in claim 16, wherein an oscillation frequency of the oscillation circuit is smaller than a center frequency of the bandpass filter.

23. An infrared signal processing circuit comprising:

a photo-acceptance element for converting an infrared signal received into an electric signal;

an amplifying circuit for amplifying the electric signal;

a bandpass filter for extracting a carrier frequency component from the electric signal having been amplified;

a carrier detection circuit for performing carrier detection from the carrier frequency component having been extracted having been extracted; and an integrating circuit for integrating a carrier detected in the carrier frequency component, the carrier detection circuit including a first comparing circuit;

a second comparing circuit;

an oscillation circuit for oscillating clock signals; and a logic circuit, wherein:

said first comparing circuit compares (i) an output signal of the bandpass filter with (ii) a first threshold voltage which is a noise detection level;

said second comparing circuit compares (i) the output signal of the bandpass filter with (ii) a second threshold voltage which is a first carrier detection level, and whose level is higher than that the first threshold voltage; and said logical circuit includes:

a first counter which counts clock signals from the oscillation circuit, and (i) outputs, when a first predetermined number of the pulses are counted, first amplifying circuit control signals for use in increasing the gain of the amplifying circuit and (ii) outputs, when a second predetermined number of the pulses are counted, bandpass filter control signals for use in increasing the gain and Q-value of the bandpass filter;

a second counter which counts the output signals from the first comparing circuit and outputs, when a third predetermined number of the pulses are counted, second amplifying circuit control signals for use in decreasing the gain of the amplifying circuit;

a first up-down counter which (i) counts the first amplifying circuit control signals and outputs a first control signal for causing an increase in the gain of the amplifying circuit, and (ii) counts the second amplifying circuit control signals and outputs a second control signal for causing a decrease in the gain of the amplifying circuit; and a second up-down counter which counts the bandpass filter control signals and outputs a third control signal for causing increase in the gain and Q-value of the bandpass filter, an output signal from the second comparing circuit is input to a reset terminal of the first counter, the logical circuit controls the gain of the amplifying circuit with use of the first control signal and the second control signal so that the output signal of said first comparing circuit is not output and controls the gain and Q-value of the bandpass filter with use of the third control signal, and the output signal of said second comparing circuit is the carrier.

24. A method for controlling a carrier detection circuit for use in an infrared signal processing circuit including a photo-acceptance element for converting an infrared signal received into an electric signal, an amplifying circuit for amplifying the electric signal, a bandpass filter for extracting a carrier frequency component from the electric signal having been amplified, and an integrating circuit for integrating a carrier detected in the carrier frequency component, the method comprising the steps of:

causing a first comparing circuit to compare (i) an output signal of the bandpass filter with (ii) a first threshold voltage which is a noise detection level;

causing a second comparing circuit to compare (i) the output signal of the bandpass filter with (ii) a second threshold voltage which is a first carrier detection level, and whose level is higher than that the first threshold voltage;

causing a first counter in a logical circuit which first counter has a reset terminal to which an output signal from the second comparing circuit is input to count clock signals from the oscillation circuit, and (i) output, when a first predetermined number of the pulses are counted, first amplifying circuit control signals for use in increasing the gain of the amplifying circuit and (ii) output, when a second predetermined number of the pulses are counted, bandpass filter control signals for use in increasing the gain and Q-value of the bandpass filter;

causing a second counter in the logical circuit to count the output signals from the first comparing circuit and output, when a third predetermined number of the pulses are counted, second amplifying circuit control signals for use in decreasing the gain of the amplifying circuit;

causing a first up-down counter in the logical circuit to (i) count the first amplifying circuit control signals and output a first control signal for causing an increase in the gain of the amplifying circuit, and (ii) count the second amplifying circuit control signals and output a second control signal for causing a decrease in the gain of the amplifying circuit;

causing a second up-down counter in the logical circuit to count the bandpass filter control signals and output a third control signal for causing increase in the gain and Q-value of the bandpass filter;

causing the logical circuit to control the gain of the amplifying circuit with use of the first control signal and the second control signal so that the output signal of said first comparing circuit is not output and control the gain and Q-value of the bandpass filter with use of the third control signal; and outputting as the carrier the output signal of said second comparing circuit.

* * * * *